(12) United States Patent
McCormick

(10) Patent No.: US 10,311,456 B2
(45) Date of Patent: Jun. 4, 2019

(54) DISPENSATION DELAY PREDICTION SYSTEMS AND METHODS

(71) Applicant: Quick Bites, Inc., Anchorage, AK (US)

(72) Inventor: Keith Dean McCormick, Anchorage, AK (US)

(*) Notice: Subject to any disclaimer, the term of this patent is extended or adjusted under 35 U.S.C. 154(b) by 0 days.

(21) Appl. No.: 15/801,180

(22) Filed: Nov. 1, 2017

(65) Prior Publication Data
US 2018/0204231 A1   Jul. 19, 2018

Related U.S. Application Data

(60) Provisional application No. 62/448,344, filed on Jan. 19, 2017.

(51) Int. Cl.
*G06Q 30/02* (2012.01)
*G06Q 10/06* (2012.01)
*H04W 4/029* (2018.01)
*G06Q 50/12* (2012.01)
*H04W 8/18* (2009.01)
*G06T 7/60* (2017.01)

(52) U.S. Cl.
CPC ......... *G06Q 30/0205* (2013.01); *G06Q 10/06* (2013.01); *H04W 4/029* (2018.02); *G06Q 50/12* (2013.01); *G06T 7/60* (2013.01); *H04W 8/18* (2013.01)

(58) Field of Classification Search
CPC .................................................. G06Q 10/0631
USPC ......................................................... 705/7.12
See application file for complete search history.

(56) References Cited

U.S. PATENT DOCUMENTS

| | | |
|---|---|---|
| 8,009,025 B2 | 8/2011 | Engstrom et al. |
| 8,155,868 B1 | 4/2012 | Xing et al. |
| 8,655,588 B2 | 2/2014 | Wong et al. |
| 9,285,234 B1* | 3/2016 | Graf .................. G01C 21/3614 |
| 9,330,565 B2 | 5/2016 | Petty et al. |
| 9,514,473 B2 | 12/2016 | Sen |
| 9,519,286 B2 | 12/2016 | Lacaze et al. |
| 9,542,843 B2 | 1/2017 | Stahlin et al. |
| 2003/0190058 A1 | 10/2003 | Jun et al. |
| 2005/0154560 A1* | 7/2005 | Fitzpatrick ............ G06Q 10/06 702/182 |
| 2014/0074743 A1 | 3/2014 | Rademaker et al. |
| 2015/0094046 A1 | 4/2015 | Jung et al. |
| 2015/0220952 A1 | 8/2015 | Sen |
| 2016/0307265 A1* | 10/2016 | Seaward ............ G06Q 30/0637 |
| 2017/0018041 A1* | 1/2017 | Fox ........................ G06Q 50/12 |

* cited by examiner

*Primary Examiner* — Nadja N Chong Cruz

(57) ABSTRACT

Provided herein are systems and methods relating to prediction in a context of first and second client devices related to a provider facility (a drive-through that sells comestible goods, e.g.) wherein the first client device is aboard a first vehicle and predictive data relating to the first client device is improved by retaining data relating to the second client device (having visited the provider facility on a prior same-type day, e.g.).

20 Claims, 20 Drawing Sheets

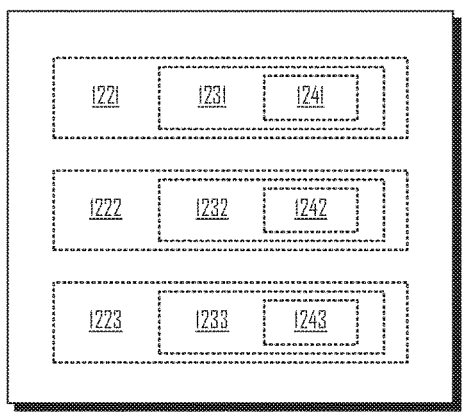
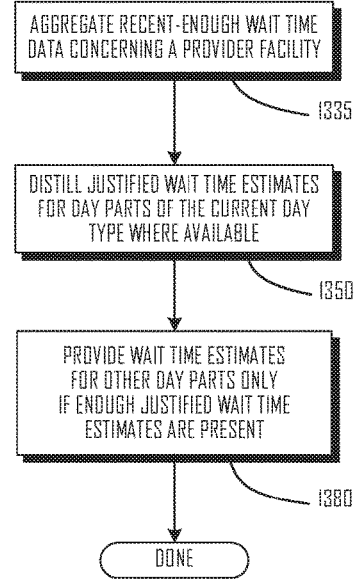

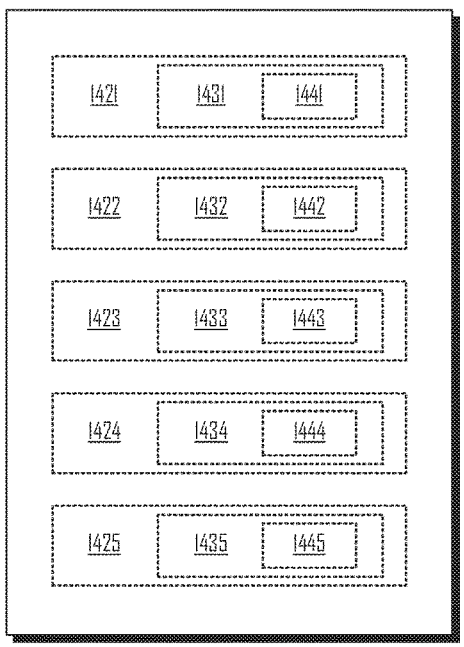
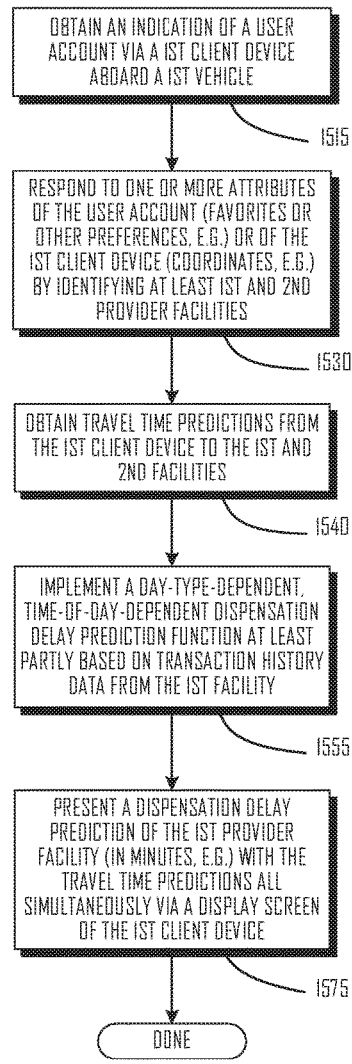

DISPENSATION DELAY PREDICTION SYSTEMS AND METHODS

CROSS-REFERENCE TO RELATED APPLICATIONS

This application claims the benefit of U.S. provisional patent application Ser. No. 62/448,344 (filed 19 Jan. 2017), which is hereby incorporated by reference in its entirety.

BRIEF DESCRIPTION OF THE DRAWINGS

FIG. 12 depicts special-purpose transistor-based circuitry according to one or more embodiments.

FIG. 13 depicts an operational flow according to one or more embodiments.

FIG. 14 depicts other special-purpose transistor-based circuitry according to one or more embodiments.

FIG. 15 depicts another operational flow according to one or more embodiments.

DETAILED DESCRIPTION

Figure 1:
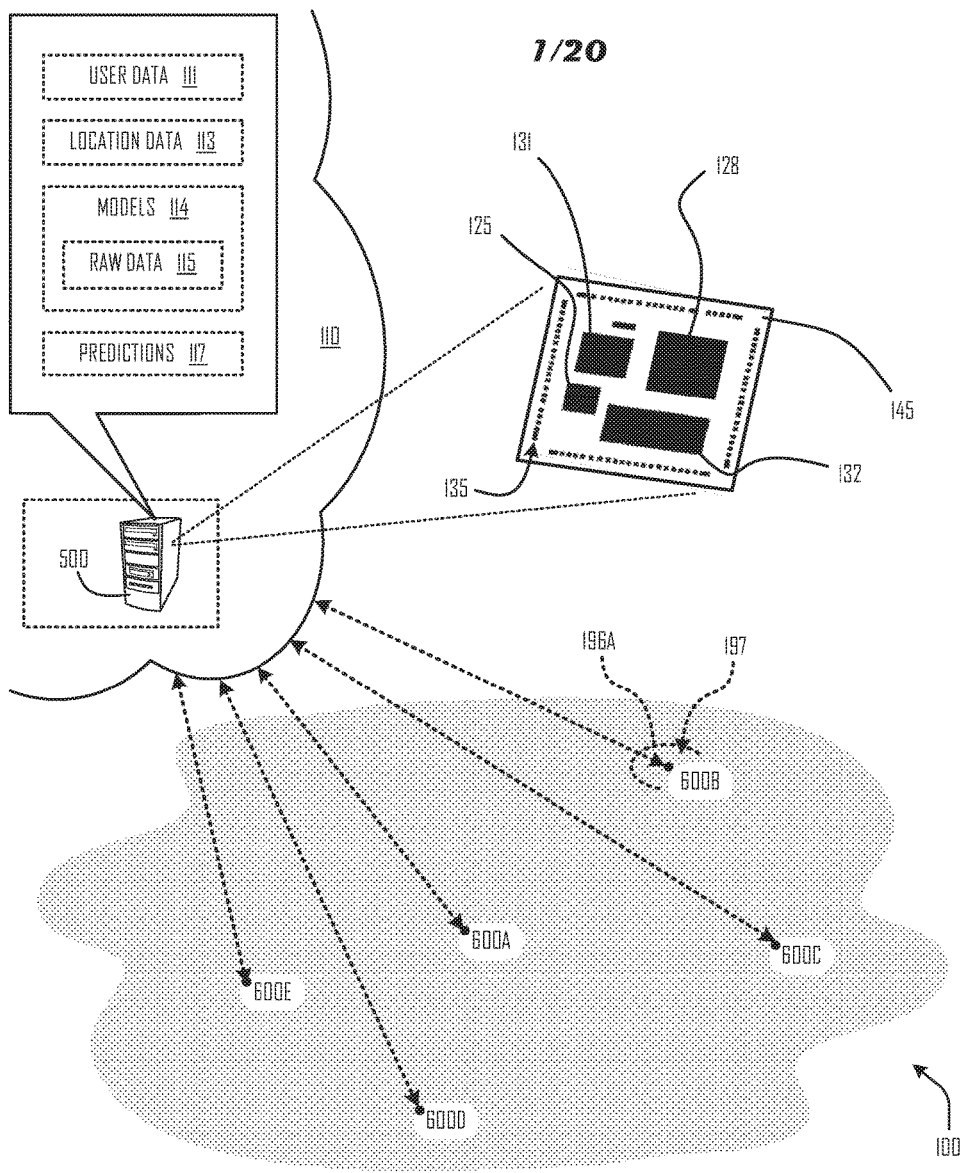
FIG. 1 depicts a system configuration dispersed across an area of land in which one or more technologies may be implemented.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Associated," "at least," "based," "before," "concerning," "invoked," "likewise," "local," "second," "stationary," "transmitted," "unique," "using," "within," or other such descriptors herein are used in their normal yes-or-no sense, not merely as terms of degree, unless context dictates otherwise. In light of the present disclosure those skilled in the art will understand from context what is meant by "remote" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a system 100 in which one or more technologies may be implemented. Several geographically dispersed client devices 600A-E are shown in communication with one or more servers 500 in network 110. One or more networked servers 500 may include one or more instances of user data 111, of location data 113, of models 114 (based on or otherwise including raw data 115 indicative of queue delays, e.g.), of predictions 117 (as described below), or of combinations thereof.

Server 500 may likewise include an integrated circuit 145 (an Application-Specific Integrated Circuit, e.g.) having one or more instances of special-purpose modules 125, 128; one or more memories 131, 132, and numerous bonding pads 135 (each an example of an electrical node as described herein) by which communicative and other electrical coupling is made (to other modules within server 500, e.g.). In some contexts, one or more client devices 600A operated by a consumer interact directly or indirectly with one or more client devices 600B operated by a provider facility. Such a facility may, for example, be effectively defined by a boundary 196A (in a vicinity 197 of device 600B, e.g.) within which patrons may form a vehicle queue. Alternatively or additionally, some such client devices 600A, 600C may each be associated with a respective motor vehicle (by virtue of being aboard, e.g.).

Figure 2:
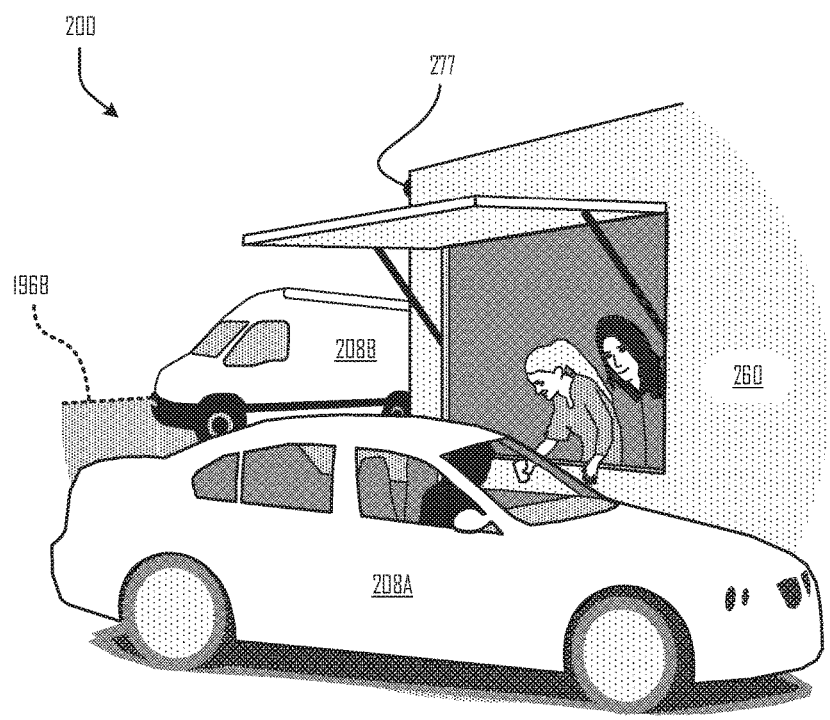
FIG. 2 depicts a provider facility in which vehicles are queued according to one or more embodiments.

FIG. 2 illustrates another system 200 in which one or more technologies may be implemented. A sequence of vehicles 208A, 208B are queued at a drive-up window or kiosk of a (mobile or other) provider facility 260 (serving comestibles or other perishable products/services, e.g.). An onsite mounted camera 277 is configured to detect when each vehicle enters facility 260 in some variants (by virtue of having crossed a boundary 196B into a vicinity of facility 260, e.g.).

Figure 3:
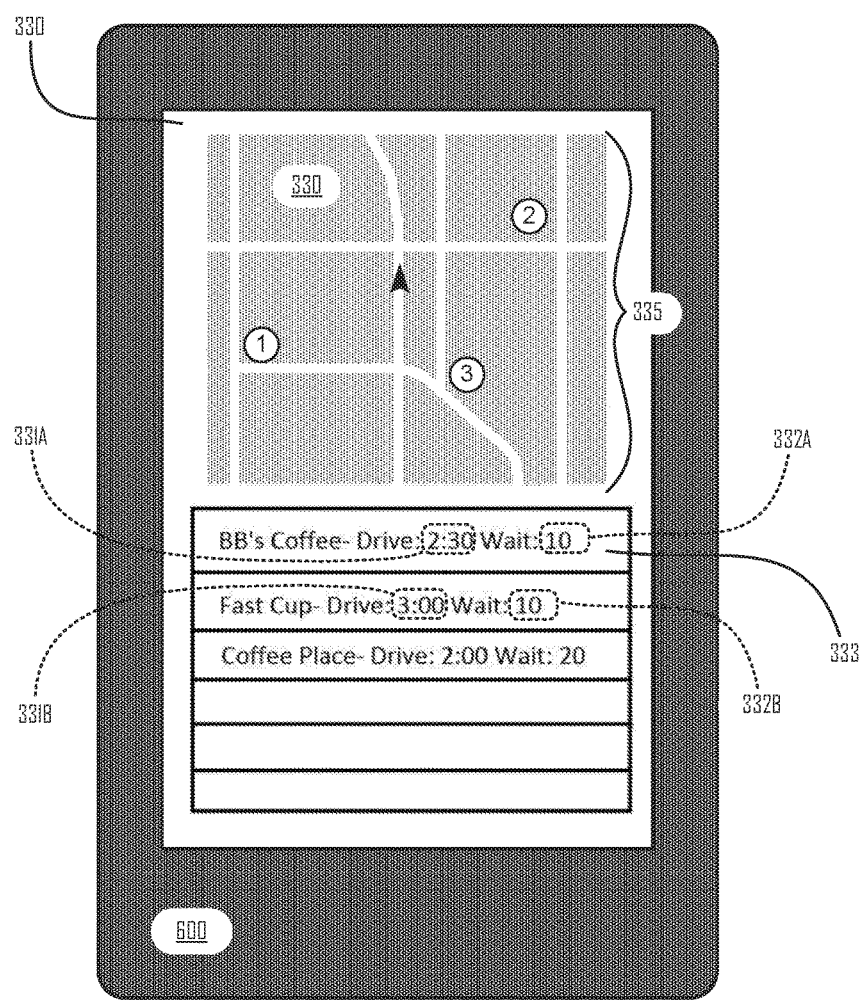
FIG. 3 depicts a display screen image featuring a map and comparing provider facility options according to one or more embodiments.

FIG. 3 illustrates a display screen image 330 provided via display hardware of a consumer-operated client device 600 (see FIG. 6) aboard a motor vehicle 208. This can occur, for example, in a context in which the consumer is the driver or a passenger of the vehicle 208; in which the motor vehicle 208 comprises or otherwise supports device 600 (see FIG. 1); and in which image 330 simultaneously depicts both a street map 335 and a dispensation delay index 332A (a wait time estimate or delivery time estimate manifested as a number of minutes, e.g.). Alternatively or additionally, image 330 may include a travel time index 331A (expressed in minutes, e.g.) that pertains to one or more destination provider facilities to which current navigational guidance (an audible or visible recommended route like that shown in FIG. 18, e.g.) pertains. In some variants, moreover, a consumer account associated with consumer-operated client device 600A causes a recordation of prior orders and the provider facilities may be ranked (as presented in image 330, e.g.) as an automatic and conditional response to an indication (in the consumer profile, e.g.) that the first provider facility is currently associated with the consumer account more recently than the second provider facility was associated with the consumer account (by respective transaction records, e.g.). Alternatively or additionally, controls for each menu option may be presented, such as a button 333 for selecting a provider facility ("BB's Coffee" e.g.).

Figure 4:
FIG. 4 depicts tabular data in a storage medium according to one or more embodiments.

FIG. 4 illustrates a storage medium 400 containing tabular data 440 (a relational database, e.g.) including numerous historical (raw or partly processed) records 441A-E aggregated as described herein. Each of the displayed records 441, for example, may mutually associate one or more instances of day types/categories 442, of exceptionality values 443 or other such record categorizations, of times-of-day 444 or other timestamps, of facility identifiers 445, of historical wait times 446, of measurement modes 447, or of measurement dates 448 in respective fields as shown (or a subset thereof). This can occur, for example, in a context in which a measurement mode 447 of "4" signals that a wait start time was determined upon an order being placed via a device 600A having GPS coordinates or other location data 123 calculated as being within a threshold distance (of 100 to 500 feet, e.g.) of the provider facility and in which a measurement mode 447 of "6" signals that a wait start time was determined in some other way (in response to a license plate, face, or other consumer profile component recognized in images captured via an onsite mounted camera 277, e.g.).

A historical dispensation delay or wait time measurement may comprise a time interval that ends upon a product dispensation, for example. In some variants, the measurement may also be bounded by a product ordering event (manifested as an "earlier" timestamp of a creation of the first delivery record, e.g.). For example, the measurement may be obtained, for a day of the proper type, by computing a difference between the earlier and later timestamps of the first delivery record.

Figure 5:
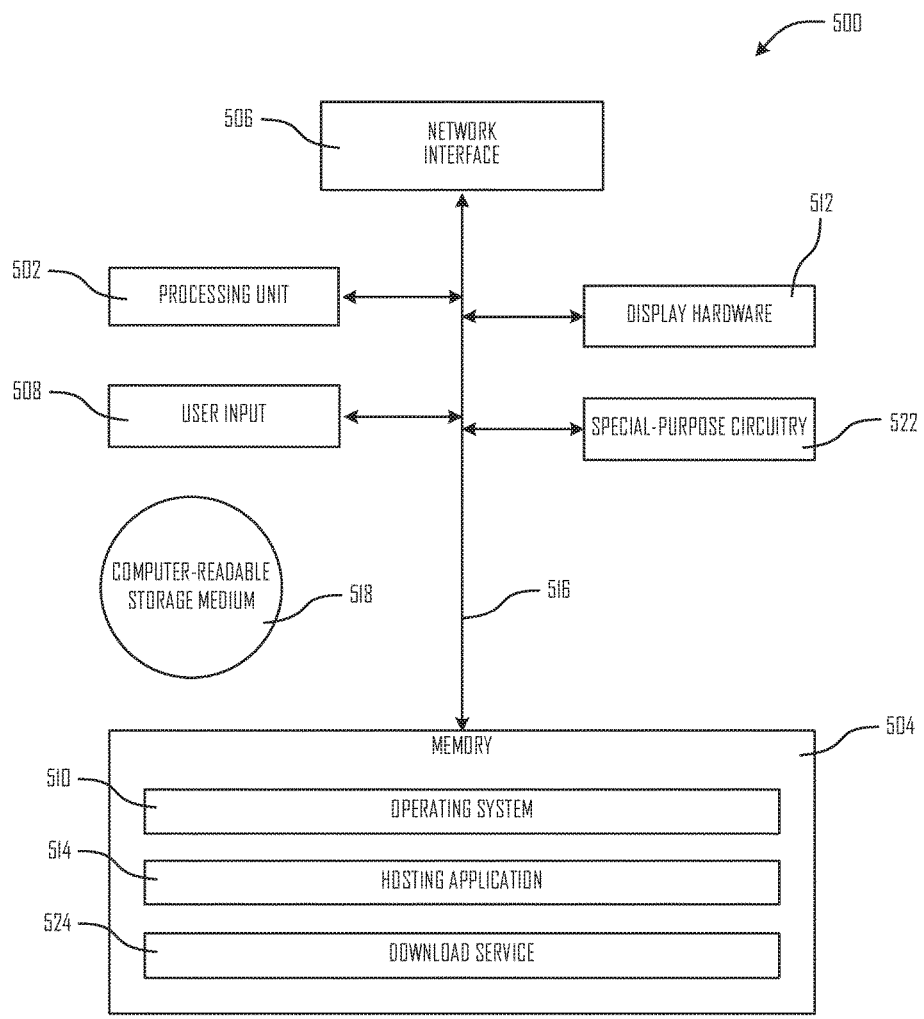
FIG. 5 depicts a server according to one or more embodiments.

FIG. 5 illustrates several components of an exemplary server 500. In some embodiments, server 500 may include many more components than those shown in FIG. 5. However, it is not necessary that all of these generally conventional components be shown in order to disclose an illustrative embodiment. As shown in FIG. 5, server 500 includes a data network interface 506 for connecting via data network 110.

Server 500 may also include one or more instances of processing unit 502, a memory 504, display hardware 512, all interconnected along with the network interface 506 via a bus 516. Memory 504 generally comprises a random access memory ("RAM"), a read only memory ("ROM"), and a permanent mass storage device, such as a disk drive.

Memory 504 may likewise contain an operating system 510, hosting application 514, and download service 524 (for downloading apps, e.g.). These and other software components may be loaded from a non-transitory computer readable storage medium 518 into memory 504 of the server 500 using a drive mechanism (not shown) associated with a non-transitory computer readable storage medium 518, such as a floppy disc, tape, DVD/CD-ROM drive, flash card, memory card, or the like. In some embodiments, software components may also be loaded via the network interface 506, rather than via a computer readable storage medium 518. Special-purpose circuitry 522 may, in some variants, include some or all of the event-sequencing logic described below.

Figure 6:
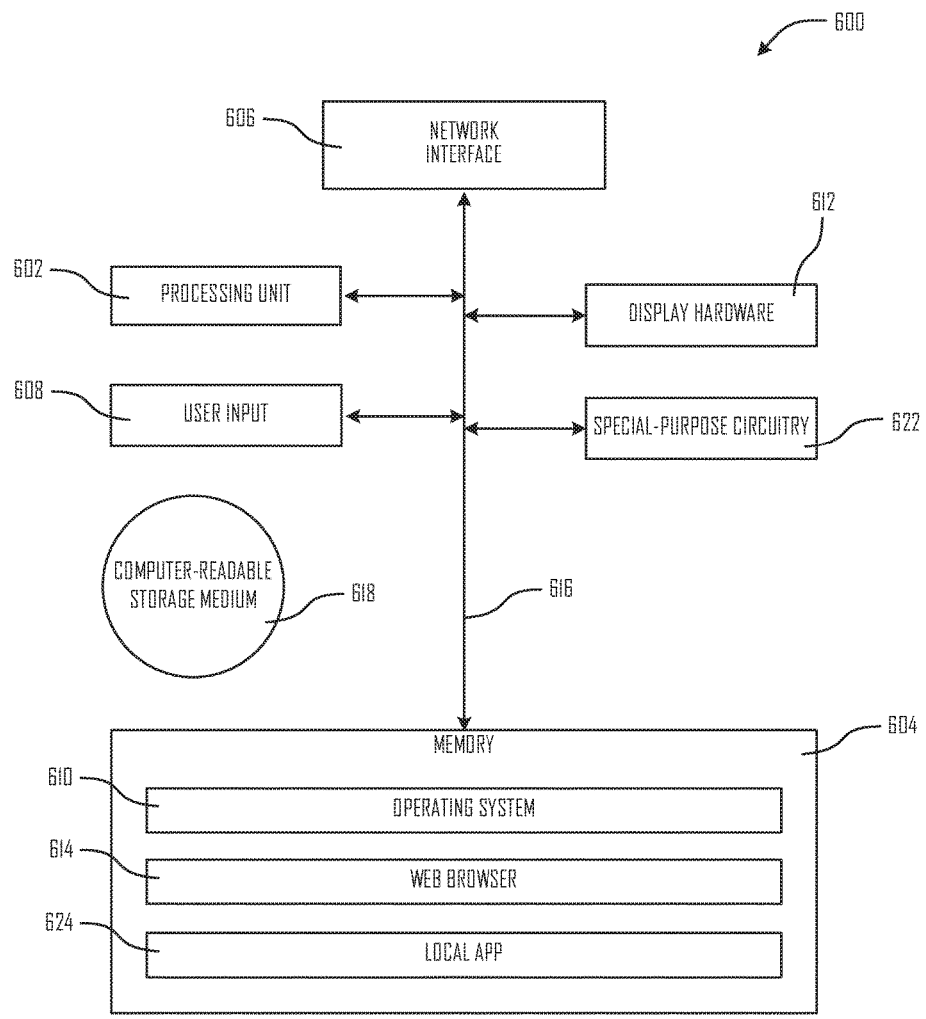
FIG. 6 depicts an exemplary (handheld or other) client device according to one or more embodiments.

FIG. 6 illustrates several components of an exemplary client device 600. In some embodiments, client device 600 may include many more components than those shown in FIG. 6. However, it is not necessary that all of these generally conventional components be shown in order to disclose an illustrative embodiment. As shown in FIG. 6, client device 600 includes a data network interface 606 for connecting via data network 110.

Client device 600 may also include one or more instances of processing unit 602, a memory 604, display hardware 612, all interconnected along with the network interface 606 via a bus 616. Memory 604 generally comprises a random access memory ("RAM"), a read only memory ("ROM"), and a permanent mass storage device, such as a disk drive.

Memory 604 may likewise contain an operating system 610, web browser 614, and local app 624 (obtained via download service 524, e.g.). These and other software components may be loaded from a non-transitory computer readable storage medium 618 into memory 604 of the client device 600 using a drive mechanism (not shown) associated with a non-transitory computer readable storage medium 618, such as a floppy disc, tape, DVD/CD-ROM drive, flash card, memory card, or the like. In some embodiments, software components may also be loaded via the network interface 606, rather than via a computer readable storage medium 618. Special-purpose circuitry 622 may, in some variants, include some or all of the event-sequencing logic described below.

Figure 7:
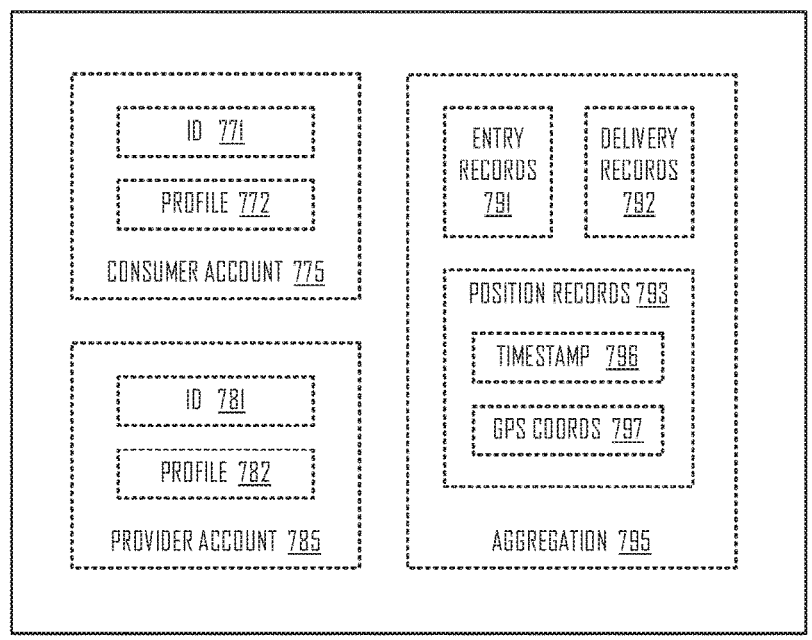
FIG. 7 depicts various account information and related data aggregation according to one or more embodiments.

FIG. 7 illustrates a (non-volatile) storage medium 700 containing one or more instances of consumer accounts 775 (associating one or more consumer account identifiers 771 with one or more corresponding profiles 772, e.g.); of provider accounts 785 (associating one or more provider account identifiers 781 with one or more corresponding profiles 782, e.g.); or of other data aggregations 795. In some variants such aggregations may mutually associate one or more instances of entry records 791, of delivery records 792, or of position records 793 (associating one or more timestamps 796 with GPS coordinates 797 or other event parameters as described herein, e.g.) or subsets thereof.

Figure 8:
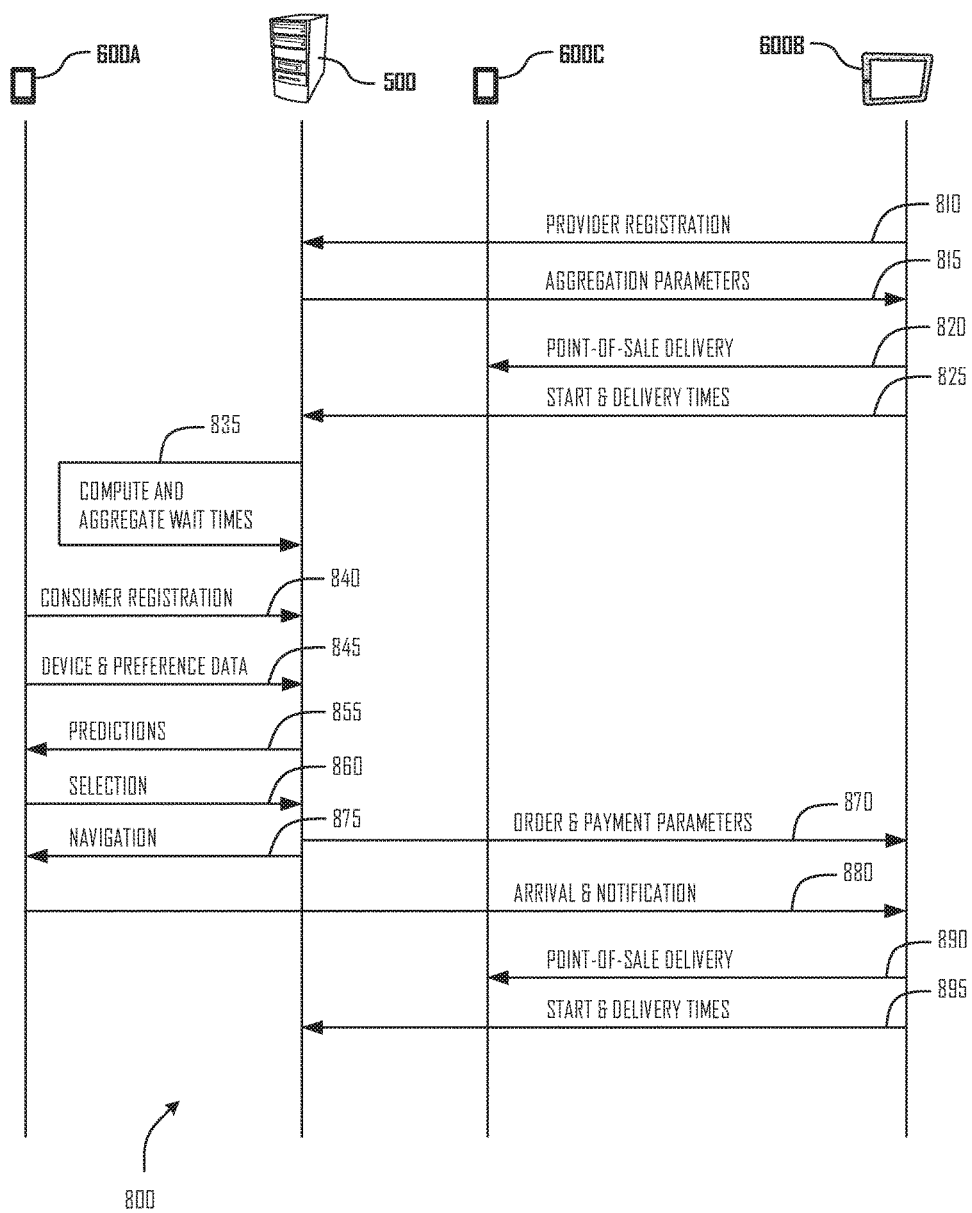
FIG. 8 depicts a high-level data flow according to one or more embodiments.

FIG. 8 illustrates a flow 800 with an exemplary series of events (communications or other processes, e.g.) suitable for use with at least one embodiment. One or more servers 500 receive provider registration requests 810 each from a respective vendor-operated client device 600B. Upon a completion of such registration, one or more aggregation parameters 815 (implemented in a local app 624 sent by download service 524, e.g.) are sent so that each vendor-operated client device 600 is configured to trigger a recordation of operational parameters concerning each point-of-sale delivery 820 (of a physical product or service, e.g.). Such parameters may include wait-time-indicative raw data 115 (start and delivery times 825, e.g.) aggregated by the one or more servers 500 (in a form like the tabular data 440 depicted in FIG. 4, e.g.).

On a later occasion, the one or more servers 500 receive one or more consumer registration requests 840 each from a respective consumer-operated client device 600A. The device uploads device and consumer preference data 845 including a consumer identifier 771 or other parameters relating to device 600A or the person using it (including order, preference, payment, or interaction data as components of consumer account 775, e.g.). In response the one or more servers 500 provide predictions 855 (concerning one or more best-estimate travel times, wait times or provider offerings, e.g.) to assist that user in making one or more selections 860 (identifying one or more facilities or products, e.g.).

In response, the one or more servers 500 may likewise provide order and payment parameters 870 so as to facilitate pre-arrival order fulfillment or navigation parameters 875 so as to facilitate turn-by-turn navigation (as exemplified in FIG. 3, e.g.) via device 600A (or both). After an arrival notification 880 or proxy thereof (signifying an arrival of device 600A at the provider facility, e.g.), a point-of-sale delivery 890 occurs (a vending machine dispensation or other delivery of goods or services reported by a vendor-operated client device 600B, e.g.). Parameters that include wait-time-indicative raw data 115 (start and delivery times 825, e.g.). Portions of flow 800 may be performed iteratively, such as by the one or more servers 500 aggregating additional wait time data associated with a point-of-sale delivery 890 and associated wait time data (aggregating further start and delivery times, e.g.).

Figure 9:
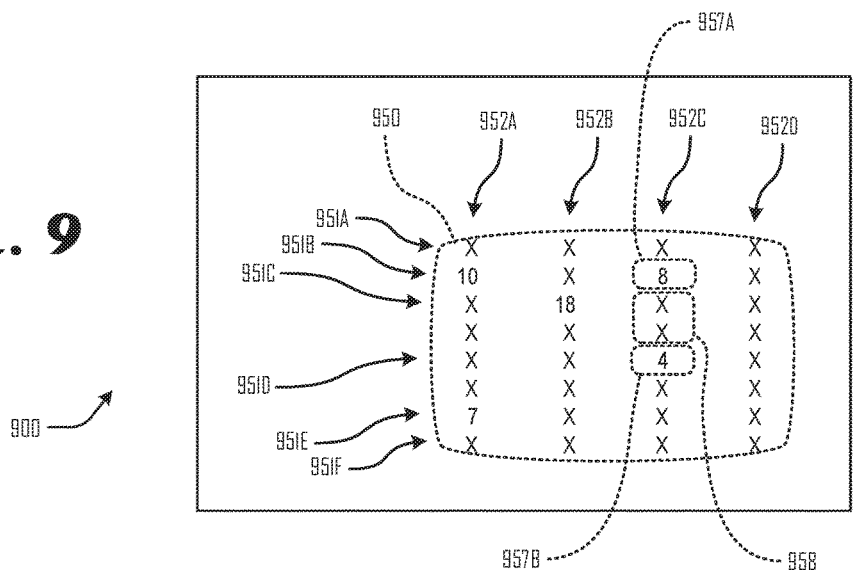
FIG. 9 depicts additional tabular data in a storage medium according to one or more embodiments.

FIG. 9 illustrates a storage medium 900 containing tabular data 950 in which numerous historical records 951A-F each coincide with a respective day part. Each column 952A-D designates a respective day type/category 442. Column 952B, for example, signals a measured delay of 18 minutes as an element of a "Black Friday" model at the day part coinciding with record 951C. Each "X" in tabular data 950 signifies an undesignated value 958, a day part of a day type for which no recent-enough data is available. Other values 957A-B signify either measurements or combinations of measurements that are "justified" by the available raw data 115.

Figure 10:
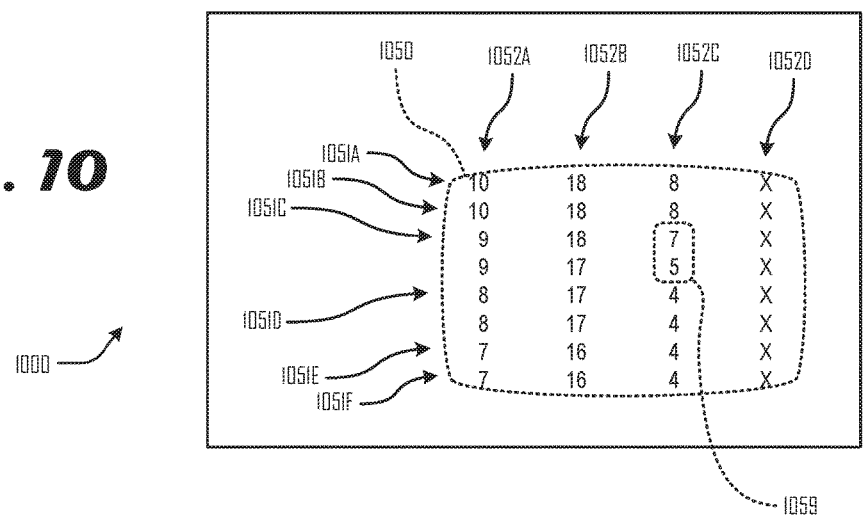
FIG. 10 depicts additional tabular data in a storage medium according to one or more embodiments.

FIG. 10 likewise illustrates a storage medium 1000 containing tabular data 1050 in which the historical records 951A-F have been adapted into extended records that each coincide with a respective day part. Each column 1052A-D designates a respective day category 442. Column 1052B, for example, signals a measured delay of 18 minutes as an element of a "Black Friday" model at the day part coinciding with record 951C and 1051C. Most instances of "X" that were present in tabular data 950 have now been replaced, where appropriate, with a speculative value 1059 based upon a suitable model as described herein (a linear interpolation rounded to a nearest whole minute or closest justified measurement/combination, e.g.).

Figure 11:
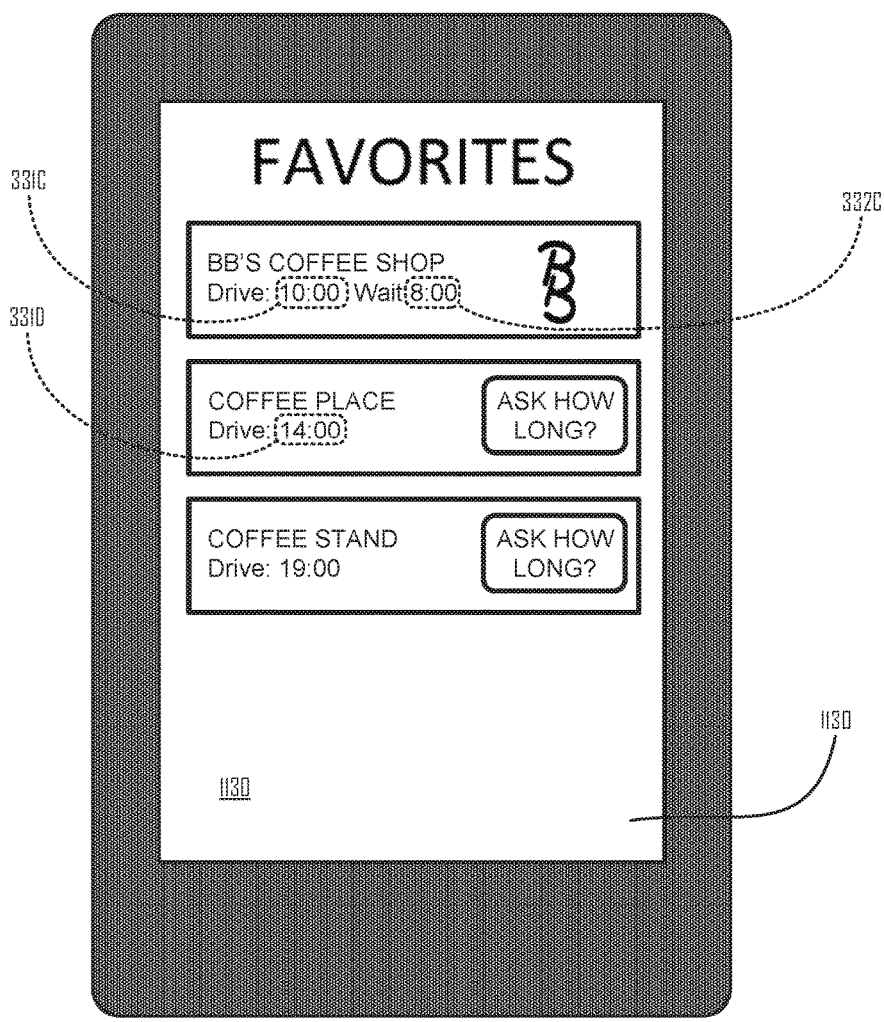
FIG. 11 depicts another display screen image according to one or more embodiments.

FIG. 11 illustrates a display screen image 1130 provided via display hardware 612 of a client device 600 (see FIG. 6) aboard a motor vehicle 208. Image 1130 presents a travel time prediction 1141 pertaining to a first provider facility, a travel time prediction 1142 pertaining to a second provider facility, and a dispensation delay prediction 1143 pertaining to the first provider facility all simultaneously. This can occur, for example, in a context in which the first provider facility has provided recent-enough historical wait times 446 measured on prior days having the same day category 442 as the current day; in which a client device 600 is associated with the first provider facility (by virtue of having a provider account 785 and having downloaded a local app 624 that facilitates such aggregation 795, e.g.); in which no such recent-enough historical wait times 446 are available in regard to the second provider facility; in which many consumers tend to select a provider facility for which a wait time is readily available; in which many provider facilities would cooperate with providing historical wait times 446 if and only if doing so will attract more customers; in which every day has a known type; and in which any other mode of evidence-based estimation of facility-specific wait times (or improvement thereof) is cost prohibitive. Alternatively or additionally, the respective facilities between which a consumer may select may be presented in a ranking that prioritizes any and all suitable facilities for which a dispensation delay index is available above any and all other facilities (i.e. for which a dispensation delay index is not available). This can occur, for example, in a context in which such one or more facilities are not yet registered (i.e. have not yet transmitted a provider registration 810) or otherwise have not yet transmitted enough start and delivery times 825 to allow a dispensation delay index to be determined for the current day type and day part.

FIG. 12 illustrates special-purpose transistor-based circuitry 1200—optionally implemented as an Application-Specific Integrated Circuit (ASIC), e.g.—in which some or all of the functional modules described below may be implemented. Transistor-based circuitry 1200 is an event-sequencing structure generally as described in U.S. Pat. Pub. No. 2015/0094046 but configured as described herein. Transistor-based circuitry 1200 may include one or more instances of modules 1221-1222 configured for local processing, for example, each including an electrical node set 1231-1232 upon which informational data is represented digitally as a corresponding voltage configuration 1241-1242. In some variants, moreover, an instance of modules 1221-1222 may be configured for invoking such local processing modules remotely in a distributed implementation. Transistor-based circuitry 1200 may likewise include one or more instances of modules 1223 configured for programmatic response as described below, for example, each including an electrical node set 1233 upon which informational data is represented digitally as a corresponding voltage configuration 1243. In some variants, an instance of modules 1223 may be configured for invoking such programmatic response modules remotely in a distributed implementation.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any records 441 or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

FIG. 13 illustrates an operational flow 1300 in which one or more technologies may be implemented (within or in conjunction with one or more servers 600, e.g.). At operation 1335, recent-enough wait time data concerning a provider facility is aggregated (one or more invocation or processing modules 1221 of special-purpose circuitry 522, 622 facilitating an aggregation of tabular data 440 including one or more records concerning facility 260 obtained in recent months, e.g.). This can occur, for example, in a context in which the one or more servers 500 receive or generate one record 441 for each transaction in which a consumer's (actual) historical wait time 446 has been measured; in which a timestamp signals a time-of-day 444 and date 448 at which such measurement was taken; in which a facility identifier 445 uniquely identifies the provider facility 260; in which voltage configuration 1241 manifests identifiers of the day category 442 and day part (an interval, preferably of at least a minute and at most an hour, into which the time-of-day falls, e.g.); in which such records 441 each indicate a day category 442 and exceptionality value 443 that pertain to each such measurement date 448; in which a shorter threshold (of 1-4 months, e.g.) is applied to unexceptional days (in which value 443 is "N," e.g.) and a longer threshold (of 18 to 38 months, e.g.) is applied to exceptional days; and in which older measurements are not "recent enough" and accordingly omitted from the aggregation. Alternatively or additionally, such processing may include other filters (by which one or more records having a measurement mode 447 later deemed unreliable are systematically disregarded, e.g.) after some records 441 are generated but before they are used (in predictions 855, e.g.). This can occur, for example, in a context in which a measurement mode 447 of "3" designates measurements in which a wait start time (as mentioned with reference to FIG. 8, e.g.) is determined in a particular way (by detecting when successive GPS coordinates of client device 600C indicate a crawling pace within 200 feet of a particular provider facility 260, e.g.) that is later deemed insufficiently reliable and in which the corresponding wait time data is accordingly disregarded.

At operation 1350, wait time estimates for some day parts of the current day type are distilled (one or more invocation or processing modules 1222 of special-purpose circuitry 522, 622 triggering or performing a distillation of justified values 957 of respective records 951B, 951D each corresponding to a respective day part of a prior day of the same day category 442 as today). This may occur, for example, in a context in which column 952C of the current day and the measurement date 448 of the record 441D have a day category 442 in common (identified as a normal, not exceptional, Sunday, e.g.); in which the categorical taxonomy (of day types 442 and exceptionality values 443, e.g.) is adequate to provide meaningful correlation and supplied with recent raw data 115; in which the time-of-day 444 of the aggregated record 441D (a 4-minute wait time measurement at 11:47 am as shown, e.g.) corresponds with the distilled record 951D (being either the only same-day-type, same-day-part value among the current-enough measurements, e.g.); in which voltage configuration 1242 manifests a memory address of justified values 957; in which such justified values 957 are deemed (at least by provider personnel, e.g.) reliable and based on prior days' performance; and in which such accurate prediction would otherwise be cost prohibitive (requiring multiple onsite security cameras and image processing, e.g.). Alternatively or additionally, operation 1350 may include multiple actual wait times for a given day type and time of day being combined (by averaging, e.g.) or otherwise distilled into the justified value 957. In some variants a model (a normal distribution, e.g.) may be employed to facilitate such combining, such as by employing a cap (of a 30-minute wait time, e.g.) or by computing a preset percentile (a median, e.g.) of the model so as to mitigate the impact of an aberrant data point (from an extremely long wait time resulting from a traffic jam or personal emergency, e.g.).

At operation 1380, wait time estimates for other day parts are provided if and only if enough justified wait time estimates are present (one or more invocation or response modules 1223 of special-purpose circuitry 522, 622 augmenting justified values 957 with one or more speculative values 1059 of wait time estimates derived by a linear interpolation or otherwise where appropriate, e.g.). This can occur, for example, in a context in which each justified value 957 is directly supported by one or more (actual) historical wait time measurements at times-of-day that are temporally near the speculative value(s) 1059 (within at most 1-2 hours, e.g.); in which multiple current-enough measurements are provided for the same provider facility and day-type (newer than 30 months for exceptional days and newer than 3 months for other days, e.g.); in which voltage configuration 1243 manifests suitable criteria (thresholds applicable to a sample size or time difference, e.g.) by which module 1223 determines whether or not to generate/present a wait-time index for time periods (day parts, e.g.) for which no hard data (justified values 957, e.g.) currently exists; and in which no default delay index is otherwise presented. See FIG. 11.

FIG. 14 illustrates special-purpose transistor-based circuitry 1400—optionally implemented as an Application-Specific Integrated Circuit (ASIC), e.g.—in which some or all of the functional modules described below may be implemented. Transistor-based circuitry 1400 is an event-sequencing structure generally as described in U.S. Pat. Pub. No. 2015/0094046 but configured as described herein. Transistor-based circuitry 1400 may include one or more instances of modules 1422-1424 configured for local processing, for example, each including an electrical node set 1432-1434 upon which informational data is represented digitally as a corresponding voltage configuration 1442-1444. In some variants, moreover, an instance of modules 1422-1424 may be configured for invoking such local processing modules remotely in a distributed implementation. Transistor-based circuitry 1400 may likewise include one or more instances of modules 1421, 1425 configured for programmatic response as described below, for example, each including an electrical node set 1431, 1435 upon which informational data is represented digitally as a corresponding voltage configuration 1441, 1445. In some variants, an instance of modules 1421, 1425 may be configured for invoking such programmatic response modules remotely in a distributed implementation.

As used herein, "processing module" refers to transistor-based circuitry that performs encoding, pattern matching, or other data-transformative operations generally as described herein. "Invocation module" refers to control circuitry that configures and triggers communication and processing modules or other event-sequencing logic generally as described herein. In light of teachings herein, those skilled in the art will be able to configure processing and implementation modules (and other modules also) within special-purpose circuitry 522, 622 of a single device 500 or server 600 or in a distributed implementation (with respective modules 1221-1223 and 1421-1425 constructed and arranged in respective systems of a cooperative network 110, e.g.).

FIG. 15 illustrates an operational flow 1500 in which one or more technologies may be implemented (within or in conjunction with one or more servers 600, e.g.). At operation 1515, an indication of a user account via a first client device aboard a first vehicle is obtained (one or more invocation or processing modules 1422 of special-purpose circuitry 522, 622 receiving device and preference data 845 as a component of a consumer profile 772 via a user input 608 aboard a first vehicle 208, e.g.). This can occur, for example, in a context in which consumer profile 772 is associated with a consumer account identifier 771 manifested as voltage configuration 1442. This may occur, for example, either during an initial consumer registration 840 or during a later login.

At operation 1530, two or more provider facilities are identified at least partly based on one or more attributes of the user account or of the consumer device (one or more invocation or response modules 1421 of special-purpose circuitry 522, 622 obtaining a facility identifier 445, street address, or other such determinants for each candidate provider facility according to their proximity to the consumer device, their status as "favorites," or other such determinants, e.g.). This can occur, for example, in a context in which the consumer device is client device 600A and in which the facilities' coordinates are manifested as voltage configuration 1441.

At operation 1540, travel time predictions from the first client device at least to the first and second facilities are obtained (one or more invocation or processing modules 1423 of special-purpose circuitry 522, 622 generating or receiving conventional travel time predictions or other travel time indexes 331 to the first and second facilities from a current location of client device 600A. This can occur, for example, in a context in which special-purpose circuitry 622 within device 600A includes a Global Positioning System (GPS) receiver and in which GPS coordinates are manifested as voltage configuration 1443.

At operation 1555, a day-type-dependent, time-of-day-dependent dispensation delay prediction function at least partly based on transaction history data from the first facility is implemented (one or more invocation or processing modules 1424 of special-purpose circuitry 522, 622 generating or receiving a numerical series of dispensation delay indexes 332 specific to a day category 442 that matches the current day that also varies according to a timestamp or other day part, e.g.). This can occur, for example, in a context in which the prediction function is expressed as a series of scalar numbers (as an appropriate column 1052 of fields of extended records 1051, e.g.) generated from partly processed records 441 (as described with reference to FIG. 13, e.g.); in which such processing is performed upon demand (as a real time response to device and preference data 845 signifying a consumer data request, e.g.), in advance (each night as a batch process, e.g.), or as some combination thereof; and in which the prediction function is digitally encoded as voltage configuration 1444.

At operation 1575, a dispensation delay prediction of the first provider facility (in minutes, e.g.) with the travel time predictions are all presented simultaneously via a display screen of the first client device (one or more invocation or response modules 1425 of special-purpose circuitry 522, 622 remotely transmitting or locally displaying a at least one dispensation delay index 332 with at least two travel time indexes via display hardware 612 of client device 600A, e.g.). This can occur, for example, in a context in which such presentation takes the form of a rectangular graphical image 330, 1130 as described herein; in which the parameters for display are digitally encoded as voltage configuration 1445; in which such display content provides a critical nexus of timely information without which a critical mass of provider participation (including provider registrations 810 and start and delivery times 825, e.g.) would not occur and without which a critical mass of consumer participation (order manifestation as selections 860, e.g.) would also not occur. In some variants, also, a current wait time estimate pertaining to a particular provider facility 260 is prominently displayed within said facility (on a wall-mounted device 600 while operation 1575 occurs, e.g.) so as to motivate workers within to reduce the wait times assigned to said facility over the course of days and weeks (by demonstrating that wait time predictions as described herein are both accurate and fluid, e.g.).

Figure 16:
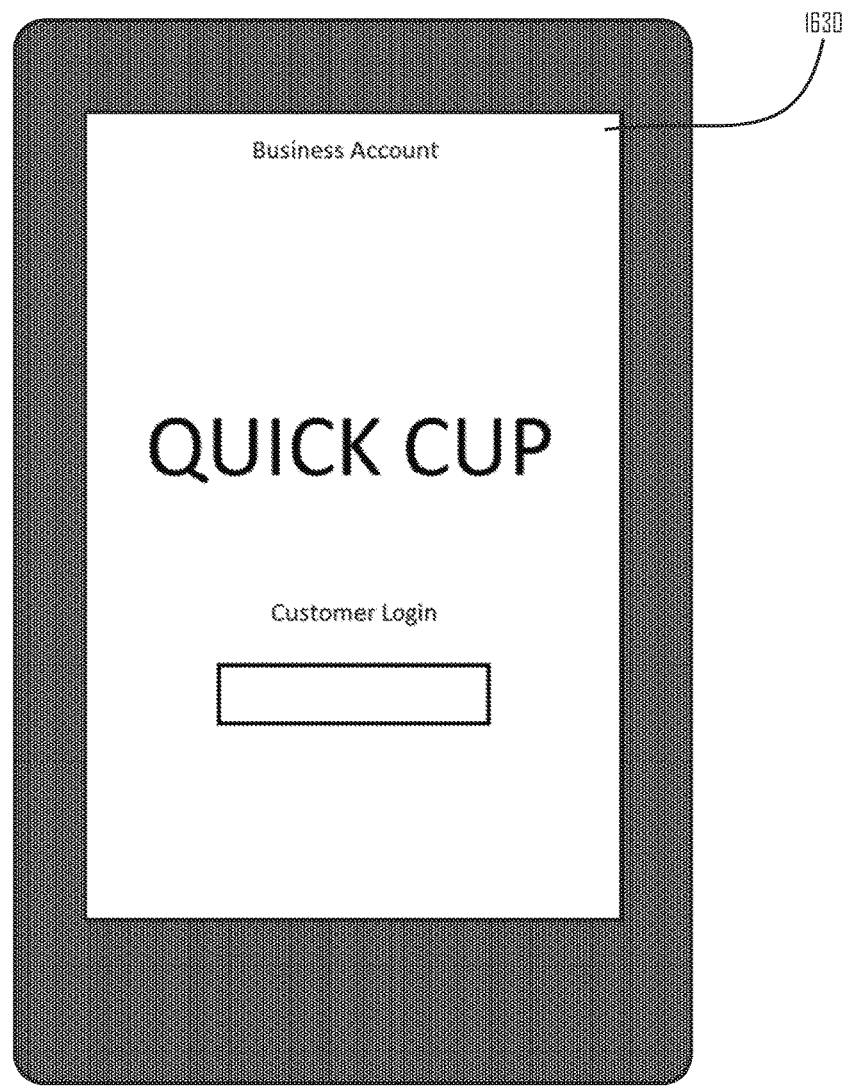
FIG. 16 depicts another display screen image according to one or more embodiments.

FIG. 16 illustrates a display screen image 1630 provided via display hardware 612 of a handheld client device 600 (see FIG. 6) aboard a motor vehicle 208. Image 1130 presents a home page that is displayed when local app 624 opens, featuring a data entry field for secure login.

Figure 17:
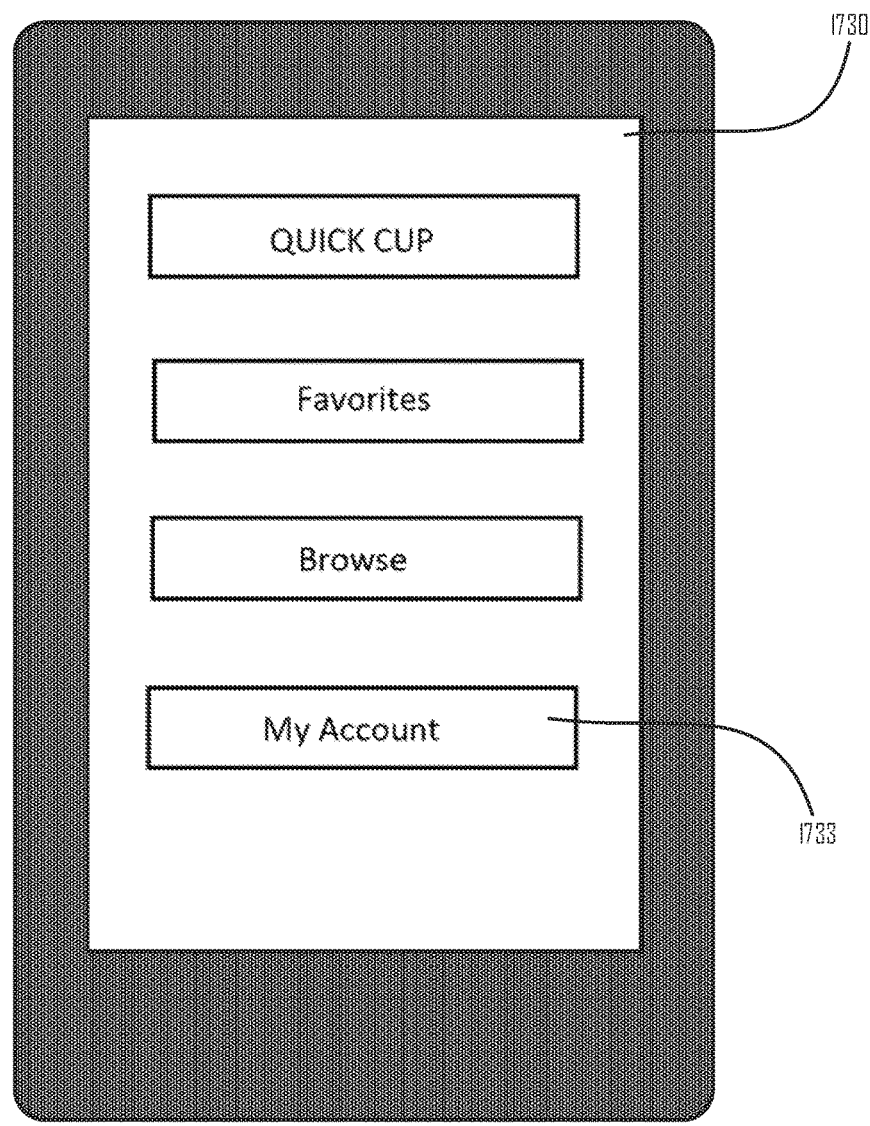
FIG. 17 depicts another display screen image according to one or more embodiments.

FIG. 17 illustrates a display screen image 1730 provided via display hardware 612 of a client device 600 (see FIG. 6) aboard a motor vehicle 208. Image 1730 presents a post-login menu featuring several touchscreen controls. The "My Account" button 1733, for example, allows a user to adjust one or more profiles as described above. After a consumer device 600 is configured for a particular user, in some variants, a menu like image 1730 may be presented as an immediate response to local app 624 being opened.

Figure 18:
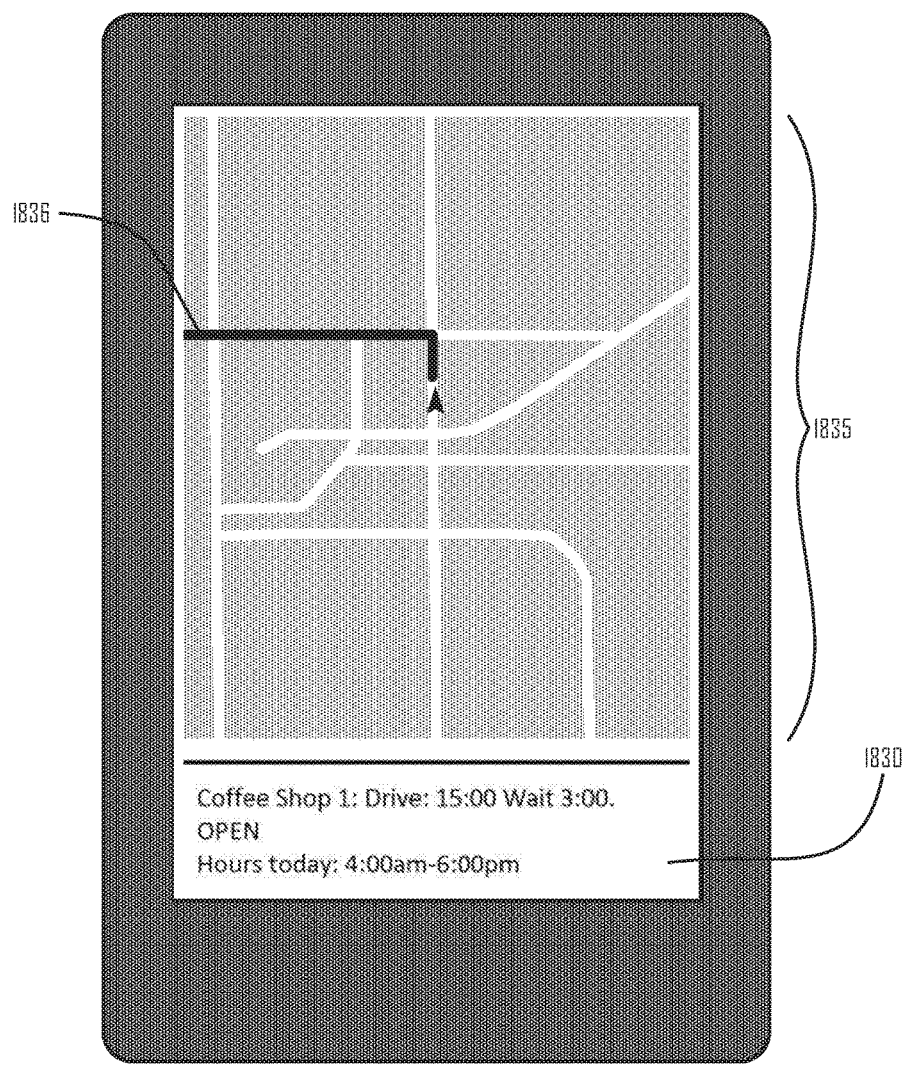
FIG. 18 depicts another display screen image according to one or more embodiments.

FIG. 18 illustrates a display screen image 1830 provided via display hardware 612 of a client device 600 (see FIG. 6) aboard a motor vehicle 208. Image 1830 presents a map 1835 with navigation guidance 1836 being presented to a consumer who has selected a specific provider facility. In addition, image 1830 includes a travel time index and a wait time index that are both simultaneously displayed with the navigation guidance 1836.

Figure 19:
FIG. 19 depicts a "business face page" display screen image according to one or more embodiments.

FIG. 19 illustrates a "business face page," a display screen image 1930 provided via display hardware 612 of a client device 600 (see FIG. 6) aboard a motor vehicle 208. Image 1930 displays a facility name, dispensation delay index 332D, and promotional information. Image 1930 also presents a button 1933 by which a consumer-operated device 600 (logged into a consumer account 775 in which a consumer profile 772 includes a credit/debit card or other mode of payment, e.g.) may execute an actual purchase or other order placement even while remote from the facility to which it pertains.

Figure 20:
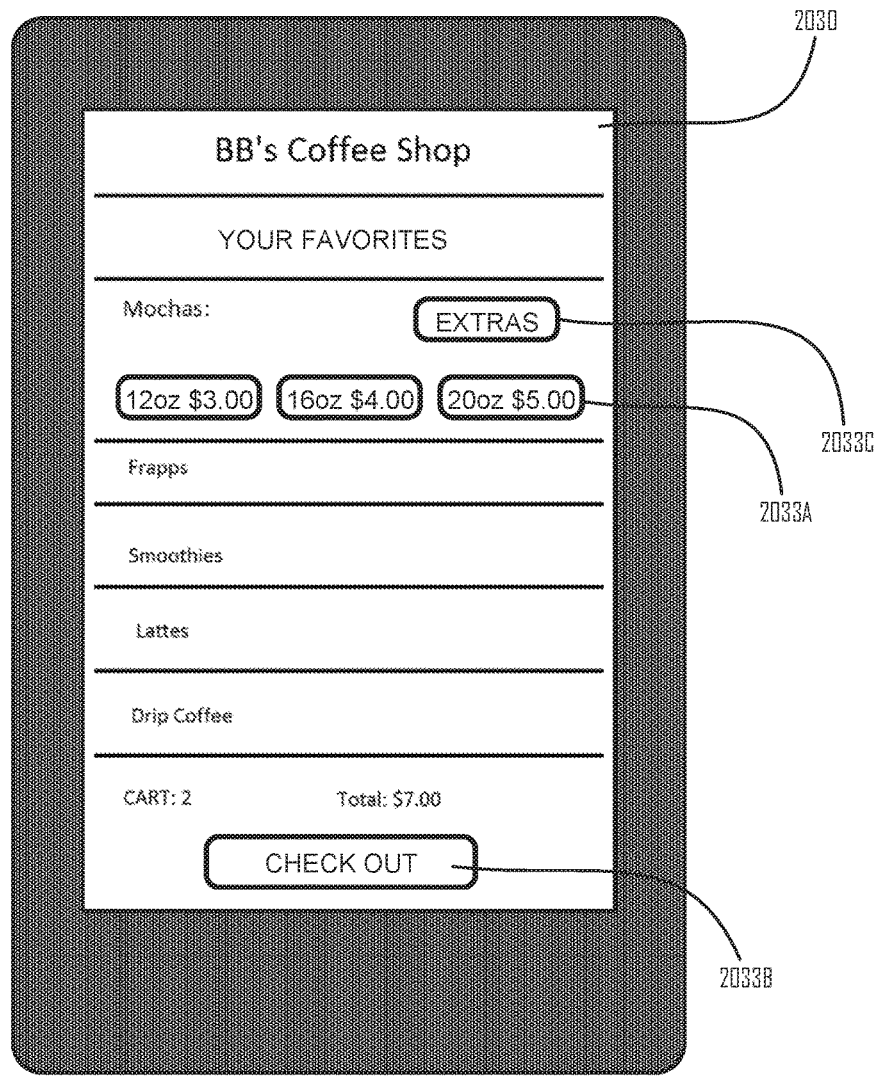
FIG. 20 depicts another display screen image according to one or more embodiments.

FIG. 20 illustrates a display screen image 2030 provided via display hardware 612 of a client device 600 (see FIG. 6) aboard a motor vehicle 208. Image 2030 presents a plurality of controls and other information including a first button 2033A (comprising a product description and price, e.g.) by which a consumer can quickly add a selected product to a cart and a second button 2033B by which a consumer-operated device 600 (logged into a consumer account 775, e.g.) may execute an actual purchase or other order placement even while remote from the facility to which it pertains. Alternatively or additionally, image 2030 may include a button 2033C that, when activated, will open a drop-down menu by which a consumer may customize a product order (by selecting an "extra shot" or "soy milk" option, e.g.).

Figure 21:
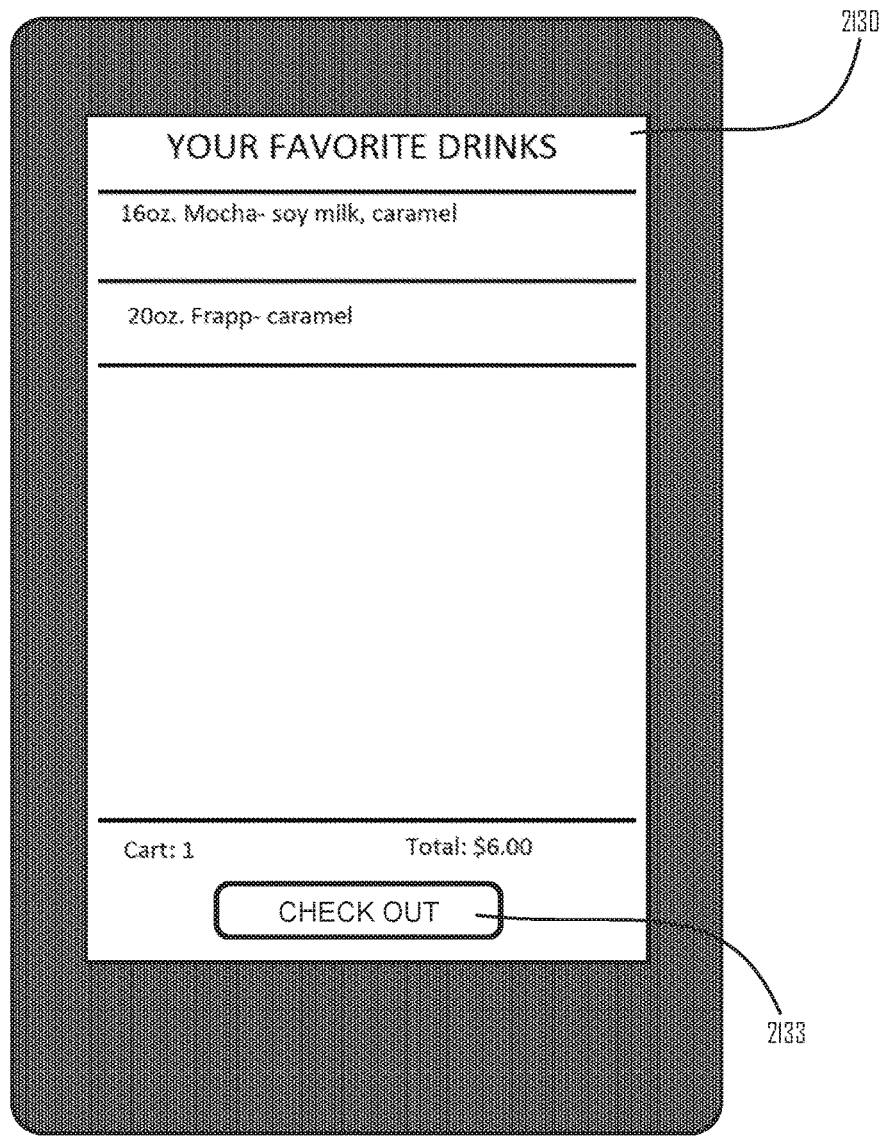
FIG. 21 depicts another display screen image according to one or more embodiments.

FIG. 21 illustrates a display screen image 2130 provided via display hardware 612 of a client device 600 (see FIG. 6) aboard a motor vehicle 208. Image 2130 presents a sub-page in which a button 2133 allows a consumer to execute an actual purchase or other order placement even while remote from the facility to which it pertains. Alternatively or additionally, image 2130 may include additional information or controls by which a current checkout cart may be modified.

Figure 22:
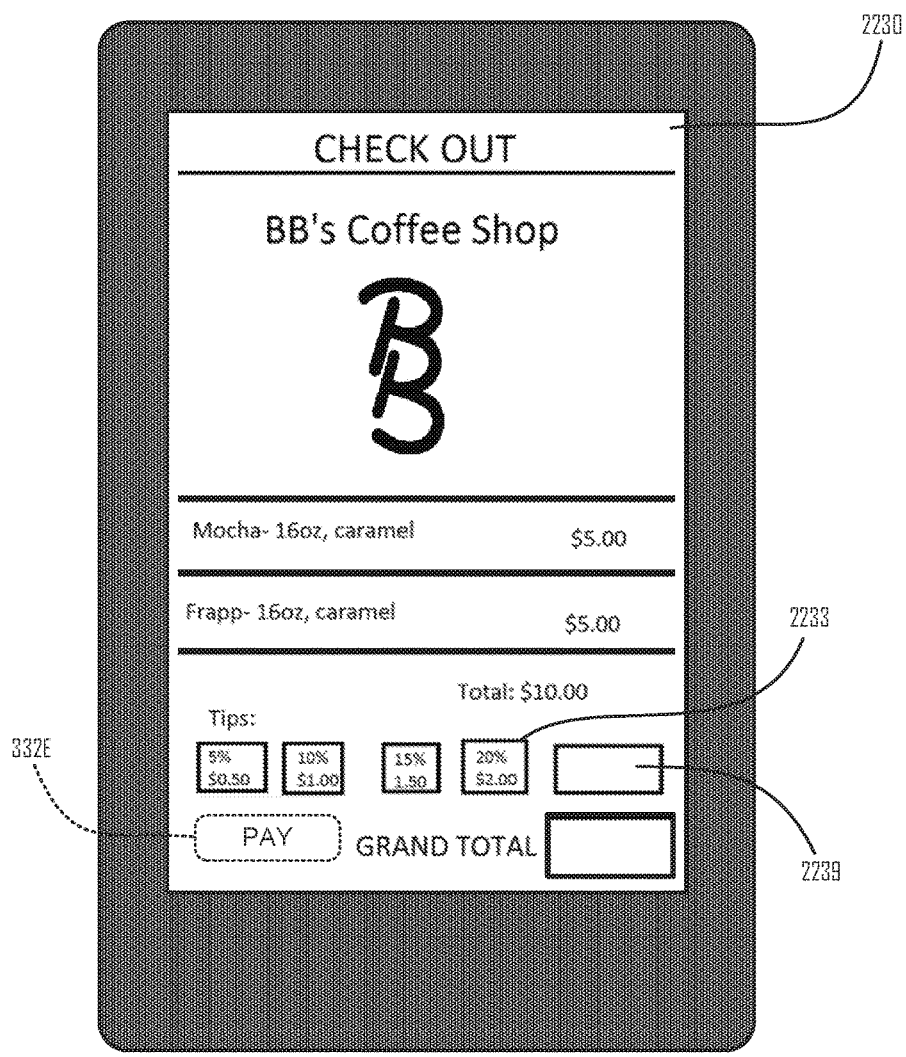
FIG. 22 depicts another display screen image according to one or more embodiments.

FIG. 22 illustrates a display screen image 2230 provided via display hardware 612 of a client device 600 (see FIG. 6) aboard a motor vehicle 208. Image 2230 presents a sub-page in which a tentative order of a plurality of items is in progress. A computed sub-total is provided with an array of controls 2233 among which a consumer may select. If a consumer does not want to enter a custom tip amount (into scalar data entry field 2239, e.g.) using a keypad, any of the provided buttons 2233 may thereby be used instead to select among the recommended options (for a tip amount or other purchase feature, e.g.). In either case, field 2239 being populated triggers both a grand total to be calculated and a disabled button 332E (greyed out, e.g.) to be enabled.

Figure 23:
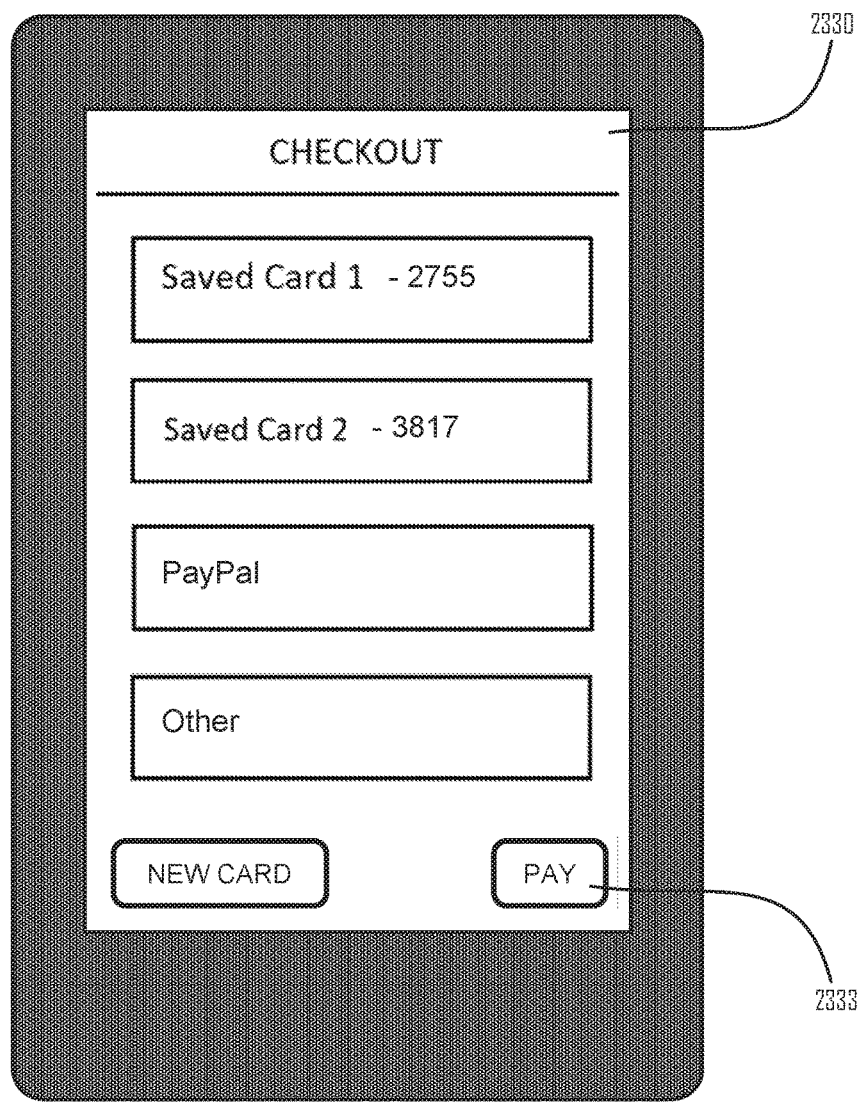
FIG. 23 depicts a checkout display screen image according to one or more embodiments.

FIG. 23 illustrates a checkout display screen image 2330 provided via display hardware 612 of a client device 600 (see FIG. 6) aboard a motor vehicle 208. Image 2330 presents a sub-page in which a plurality of payment modes are presented, each being a component of a consumer profile 772. Upon clicking a payment authorization button 2333, in some variants, a consumer may be prompted to enter an alphanumeric security code (password, e.g.).

With respect to method embodiments described herein, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Referring again to FIG. 13, in some variants operational flow 1300 may be enhanced with artificially originated or enhanced wait time models 114. This can occur, for example, in a context in which one or more comparable provider facilities have been identified (as an automatic response to a provider registration 810, e.g.) for which significant raw data is already available, in which server 500 identifies one or more most-comparable facilities (ranked by proximity of provider-estimated wait times, product offerings, sales volumes, or other metrics to those of a newly-arrived provider profile 782, e.g.) for validation by a technician, and in which an appropriate tabular data 440 is used to compute and aggregate wait times 835 in response to such validation so as to provide an initial wait time model 114. Alternatively or additionally, an artificial measurement mode 447 may comprise either an identifier of the technician who authorizes such artificial configuration of the wait time model 114 or an identifier of the technician-provided protocol by which such validations are automatically generated.

In light of teachings herein, numerous existing techniques may be applied for configuring special-purpose circuitry or other structures effective for obtaining and applying entity profiles, data associations, estimation, or other tasks as described herein without undue experimentation. See, e.g., U.S. Pat. No. 9,542,843 ("Personalized updating of digital navigation maps"); U.S. Pat. No. 9,519,286 ("Delayed telop aid"); U.S. Pat. No. 9,514,473 ("Location-based cognitive and predictive communication system"); U.S. Pat. No. 9,330,565 ("Traffic bottleneck detection and classification on a transportation network graph"); U.S. Pat. No. 8,655,588 ("Method and apparatus for providing accurate localization for an industrial vehicle"); U.S. Pat. No. 8,155,868 ("Managing vehicle efficiency"); U.S. Pat. No. 8,009,025 ("Method and system for interaction between a vehicle driver and a plurality of applications"); U.S. Pub. No. 2015/0220952 ("Location-based cognitive and predictive communication system"); U.S. Pub. No. 2014/0074743 ("Systems and methods for managing curb-side delivery"); U.S. Pub. No. 2005/0154560 ("Real-time prediction and management of food product demand"); and U.S. Pub. No. 2003/0190058 ("Apparatus and method for measuring queue length of vehicles"). These documents are incorporated herein by reference to the extent not inconsistent herewith.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses 1. (Independent) A COMPUTER-IMPLEMENTED ORDER FACILITATION SYSTEM relating first and second client devices to a first provider facility wherein the first client device is aboard a first vehicle 208, the computer-implemented order facilitation system comprising:

transistor-based circuitry (one or more components of special-purpose circuitry 522 in server 500, e.g.) configured to obtain a category 442 (a day type identified by a label like "FRIDAY" or "XMAS DAY" in conjunction with Boolean exceptionality value 443, e.g.) of a current day (i.e. today) and a current day part (an interval of a few minutes or hours represented as a time-of-day 444 at which the interval starts or ends, e.g.) within the current day, wherein the day part of the current day correlates to a single day part of a first (prior) same-type day (i.e. before the current day and of the category of the current day) corresponding to the current day part and to a single day part of a second same-type day also corresponding to the current day part;

transistor-based circuitry (one or more other components of special-purpose circuitry 522, e.g.) configured to respond to an indication (comprising a selection 860 or other component of an aggregation 795, e.g.) that an order was associated with the second client device 600; and transistor-based circuitry (one or more other components of special-purpose circuitry 522, e.g.) configured to transmit a dispensation delay prediction 117, 855 relating to the first provider facility 260 via a display screen (including display hardware 612, e.g.) of the first client device 600 aboard the first vehicle 208 partly based on when the second client device 600 reached the vicinity 197 of the first provider facility 260 on the one or more same-type days and partly based on when a dispensation associated with the second client device 600 occurred on the one or more same-type days.

2. The COMPUTER-IMPLEMENTED ORDER FACILITATION SYSTEM of Clause 1, wherein all of the transistor-based circuitry is remote (more than a mile, e.g.) from the first vehicle 208.

3. The COMPUTER-IMPLEMENTED ORDER FACILITATION SYSTEM of Clause 1, wherein the first vehicle includes the first client device, including at least some of the transistor-based circuitry configured to transmit the dispensation delay prediction relating to the first provider facility via the display screen of the first client device aboard the first vehicle.

4. The COMPUTER-IMPLEMENTED ORDER FACILITATION SYSTEM of Clause 1 or Clause 3, including the first client device 600 aboard the first vehicle 208 configured to facilitate speech recognition of one or more uttered menu selections within the first vehicle 208.

5. The system of any of the COMPUTER-IMPLEMENTED ORDER FACILITATION SYSTEMS above, including the first client device.

6. The system of any of the COMPUTER-IMPLEMENTED ORDER FACILITATION SYSTEMS above, including the second client device.

7. The system of any of the COMPUTER-IMPLEMENTED ORDER FACILITATION SYSTEMS above, including the first vehicle.

8. The system of any of the COMPUTER-IMPLEMENTED ORDER FACILITATION SYSTEMS above, wherein the first client device is a component of the first vehicle (implementing an integral navigation system thereof, e.g.).

9. The system of any of the COMPUTER-IMPLEMENTED ORDER FACILITATION SYSTEMS above, including the first provider facility.

10. The system of any of the COMPUTER-IMPLEMENTED ORDER FACILITATION SYSTEMS above, wherein the transistor-based circuitry is distributed between one or more servers 500 and the first client device 600.

11. The system of any of the COMPUTER-IMPLEMENTED ORDER FACILITATION SYSTEMS above, wherein the system is configured to perform a method of one or more of the COMPUTER-IMPLEMENTED ORDER FACILITATION METHOD CLAUSES below.

12. (Independent) A COMPUTER-IMPLEMENTED ORDER FACILITATION METHOD relating first and second client devices to a first provider facility wherein the first client device is aboard a first vehicle 208, the computer-implemented order facilitation method comprising:

invoking transistor-based circuitry (one or more other components of special-purpose circuitry 622 in the first client device 600, e.g.) configured to obtain a category 442 of a current day and a current day part (of 5-15 minutes or 30-60 minutes, e.g.) within the current day, wherein the day part of the current day correlates to a single day part (spanning the same time yesterday, e.g.) of a first same-type day corresponding to the current day part and to a single day part of a second same-type day also corresponding to the current day part;

invoking transistor-based circuitry (one or more other components of special-purpose circuitry 622 in the first client device 600, e.g.) configured to respond to an indication (comprising a record 441, 951, 1051 or other component of an aggregation 795, e.g.) that an order (a transaction request relating to goods, e.g.) was associated with the second client device 600; and transmitting a dispensation delay prediction 117, 855 relating to the first provider facility 260 via a (first) display screen of the first client device 600 aboard the first vehicle 208 partly based on when the second client device 600 reached the vicinity 197 of the first provider facility 260 on the one or more same-type days and partly based on when a dispensation (a delivery of a product as shown in FIG. 2, e.g.) associated with the second client device 600 occurred on the one or more same-type days.

13. The COMPUTER-IMPLEMENTED ORDER FACILITATION SYSTEM of Clause 1 or Clause 3, receiving one or more menu selections 860 uttered within the first vehicle 208 from an occupant who has seen the dispensation delay prediction 117, 855 on the display screen of the first client device 600 aboard the first vehicle 208; and recognizing at least one of the one or more menu selections 860 via a speech recognition module and a microphone in the first client device (as user input 608, e.g.).

14. The method of the COMPUTER-IMPLEMENTED ORDER FACILITATION METHOD clause above, further comprising:

making a determination that no point-of-sale delivery fulfilling the order was reported at the first provider facility 260 (as a component of computing and aggregating wait times 835, e.g.); and invoking the conditional response (i.e. of computing the difference) to no order fulfillment signal having been received in response to the determination that no point-of-sale delivery fulfilling the order was reported at the first provider facility 260.

15. The method of the COMPUTER-IMPLEMENTED ORDER FACILITATION METHOD clause above, further comprising:

deriving the representative intermediate value without regard to one or more outlying values (by computing a mean of some or all values in a distribution except for a minimum and maximum thereof, e.g.) in the empirical delay time data.

16. The method of the COMPUTER-IMPLEMENTED ORDER FACILITATION METHOD clause above, further comprising:

deriving the representative intermediate value without regard to one or more outlying values in the empirical delay time data by arithmetically combining several other values in the empirical delay time data (as a mode thereof or weighted or other mean thereof rounded to a whole number of minutes, e.g.).

17. The method of the COMPUTER-IMPLEMENTED ORDER FACILITATION METHOD clause above, further comprising:

deriving the representative intermediate value as a median of appropriate values in the empirical delay time data wherein the representative intermediate value is thereby computed without regard to one or more outlying values of the appropriate values in the empirical delay time data and wherein the appropriate values are identified by selectively recent-enough wait time data concerning the provider facility (by including recordations of events within a given recency interval of several months or years selectively and excluding older events, e.g.).

18. The method of the COMPUTER-IMPLEMENTED ORDER FACILITATION METHOD clause above, further comprising:

deriving the representative intermediate value as a median of appropriate values in the empirical delay time data wherein the representative intermediate value is thereby computed without regard to one or more outlying values of the appropriate values in the empirical delay time data and wherein the appropriate values are identified by selectively recent-enough wait time data concerning the provider facility (by including recordations of events within a given recency interval of several months or years selectively and excluding older events, e.g.) and also by selectively including into the empirical delay time data (as a preparatory action of the "deriving") one or more justified wait time estimates upon which the empirical delay time data is based.

19. The method of any of the COMPUTER-IMPLEMENTED ORDER FACILITATION METHOD clauses above, further comprising:

defining a vicinity 197 (identified by one of the facility identifiers 445 of FIG. 4, e.g.) of the first provider facility 260 by determining a nominal geographical perimeter (a boundary 196, e.g.) surrounding the first provider facility and not surrounding a second provider facility; and defining a vicinity 197 (identified by another of the facility identifiers 445 of FIG. 4, e.g.) of the second provider facility by determining a nominal geographical perimeter surrounding the second provider facility and not surrounding the first provider facility.

20. The method of any of the COMPUTER-IMPLEMENTED ORDER FACILITATION METHOD clauses above, further comprising:

receiving a request from an authorized user (a facility owner, e.g.) to toggle a Boolean exceptionality value 443 from an off state to an on state (as a local holiday or similar contextual anomaly known to the authorized user but not the system, e.g.) in relation to a particular day (today or tomorrow, e.g.);

computing the representative intermediate value based on the on state of the Boolean exceptionality value 443 in relation to one or more day parts of the particular day, wherein the particular day is the current day or a future day (i.e. in relation to when the request was received); and transmitting the representative intermediate value based on the on state of the Boolean exceptionality value 443 to the display screen (comprising display hardware 612, e.g.) of the first client device 600 aboard the first vehicle 208 as the dispensation delay prediction.

21. The method of any of the COMPUTER-IMPLEMENTED ORDER FACILITATION METHOD clauses above, further comprising:

receiving a request from an authorized user (a facility owner, e.g.) to toggle a Boolean exceptionality value 443 from an off state to an on state (as a local holiday or similar contextual anomaly known to the authorized user but not the system, e.g.) in relation to a particular day (today or tomorrow, e.g.);

computing the representative intermediate value based on the on state of the Boolean exceptionality value 443 in relation to one or more day parts of the particular day, wherein the particular day is the current day or a future day (i.e. in relation to when the request was received);

transmitting the representative intermediate value based on the on state of the Boolean exceptionality value 443 to the display screen (comprising display hardware 612, e.g.) of the first client device 600 aboard the first vehicle 208 as the dispensation delay prediction;

receiving another request to toggle the Boolean exceptionality value 443 from the off state to the on state in relation to the particular day;

computing the representative intermediate value again based on the off state of the Boolean exceptionality value 443 in relation to one or more day parts of the particular day; and transmitting the representative intermediate value based on the off state of the Boolean exceptionality value 443 to the display screen of the first client device 600 aboard the first vehicle 208 as the dispensation delay prediction.

22. The method of any of the COMPUTER-IMPLEMENTED ORDER FACILITATION METHOD clauses above, wherein the transmitting the dispensation delay prediction relating to the first provider facility 260 comprises:

causing one or more travel time indexes 331 (as depicted in FIG. 3) to be displayed via the display screen of the first client device 600.

23. The method of any of the COMPUTER-IMPLEMENTED ORDER FACILITATION METHOD clauses above, wherein the transmitting the dispensation delay prediction 117, 855 of the first provider facility 260 via the display screen of the first client device 600 aboard the first vehicle 208 includes distilling (selecting or computing, e.g.) a representative intermediate value (one or more predictions 855 derived as a percentile or tertile but not a minimum or maximum, e.g.) of empirical delay time data (comprising tabular data 440, 950, 1050, e.g.) (at least partly) based on two or more same-type days and specifically pertaining to the first provider facility.

24. The method of any of the COMPUTER-IMPLEMENTED ORDER FACILITATION METHOD clauses above, wherein the transmitting the dispensation delay prediction 117, 855 of the first provider facility 260 via the display screen of the first client device 600 aboard the first vehicle 208 includes distilling (selecting or computing, e.g.) a representative intermediate value (one or more predictions 855 derived as a percentile or tertile but not a minimum or maximum, e.g.) of the empirical delay time data (at least partly) based on two or more same-type days and specifically pertaining to the first provider facility and wherein the representative intermediate value is partly based on the single day part (mid-morning, e.g.) of the first same-type day (a same-type weekday, e.g.) corresponding to the current day part and partly based on the single day part of the second same-type day (three weeks ago, e.g.) corresponding to the current day part.

25. The method of any of the COMPUTER-IMPLEMENTED ORDER FACILITATION METHOD clauses above, wherein the transmitting the dispensation delay prediction 117, 855 of the first provider facility 260 via the display screen of the first client device 600 aboard the first vehicle 208 includes distilling (selecting or computing, e.g.) a representative intermediate value (one or more predictions 855 derived as a percentile or tertile but not a minimum or maximum, e.g.) of the empirical delay time data based on two or more same-type days and specifically pertaining to the first provider facility, wherein the representative intermediate value is partly based on the single day part (midmorning, e.g.) of the first same-type day (a same-type weekday, e.g.) corresponding to the current day part and partly based on the single day part of the second same-type day (three weeks ago, e.g.) corresponding to the current day part, and wherein the two or more same-type days include the first and second same-type days.

26. The method of any of the COMPUTER-IMPLEMENTED ORDER FACILITATION METHOD clauses above, wherein the invoking transistor-based circuitry configured to respond to the indication that an order was associated with the second client device 600 comprises:

computing a difference (as a prediction 117 expressed in minutes or other such delay index 332, e.g.) between when the second client device entered the vicinity 197 of the first provider facility 260 and when the second client device 600 left the vicinity 197 of the first provider facility 260 as a component of empirical delay time data (comprising raw data 115, e.g.) based on the first same-type day.

27. The method of any of the COMPUTER-IMPLEMENTED ORDER FACILITATION METHOD clauses above, wherein the method is performed aboard the first vehicle 208.

28. The method of any of the COMPUTER-IMPLEMENTED ORDER FACILITATION METHOD clauses above, wherein at least one prior day within a week before the current day is not a same-type day.

29. The method of any of the COMPUTER-IMPLEMENTED ORDER FACILITATION METHOD clauses above, wherein the transmitting the dispensation delay prediction 117, 855 of the first provider facility 260 via the display screen of the first client device 600 aboard the first vehicle 208 includes establishing when the dispensation associated with the second client device occurred on the one or more same-type days according to when (a server or other agency of) the first provider facility confirms that the order has been dispensed.

30. The method of any of the COMPUTER-IMPLEMENTED ORDER FACILITATION METHOD clauses above, wherein the transmitting the dispensation delay prediction 117, 855 of the first provider facility 260 via the display screen of the first client device 600 aboard the first vehicle 208 includes establishing when the dispensation associated with the second client device occurred on the one or more same-type days either according to when (a server or other agency of) the first provider facility confirms that the order has been dispensed or according to when the second client device (purportedly or actually) left the vicinity of the first provider facility (a GPS of the second client device or other agency aboard a vehicle bearing the second client device).

31. The method of any of the COMPUTER-IMPLEMENTED ORDER FACILITATION METHOD clauses above, wherein the transmitting the dispensation delay prediction 117, 855 of the first provider facility 260 via the display screen of the first client device 600 aboard the first vehicle 208 includes establishing when the dispensation associated with the second client device occurred on the one or more same-type days according to when the second client device (purportedly or actually) left the vicinity of the first provider facility (a GPS of the second client device or other agency aboard a vehicle bearing the second client device).

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A computer-implemented order facilitation method relating first and second client devices to a first provider facility wherein said first client device is aboard a first vehicle, said computer-implemented order facilitation method comprising:

obtaining an indication of a user account via said first client device aboard said first vehicle;

responding to one or more attributes of said user account or of said first client device by identifying multiple provider facilities including said first provider facility;

invoking transistor-based circuitry configured to obtain a category of a current day and a current day part within said current day, wherein said day part of said current day correlates to a single day part of a first same-type day corresponding to said current day part and to a single day part of a second same-type day also corresponding to said current day part and wherein at least one prior day within a week before said current day is not a same-type day, wherein said category indicates that said current day is exceptional, wherein said first and second same-type days are also exceptional, wherein said computer-implemented order facilitation method has applied a longer threshold to said first and second same-type days than a threshold applicable to unexceptional prior days in said computer-implemented order facilitation method, and wherein said longer threshold is more than 4 months;

invoking transistor-based circuitry configured to respond to an indication that an order was associated with said second client device by computing a difference between when said second client device entered a vicinity of said first provider facility and when said second client device left said vicinity of said first provider facility as a component of empirical delay time data based on said first same-type day as a conditional response to no order fulfillment signal having been received, wherein when said second client device left said vicinity of said first provider facility is used in establishing when a dispensation associated with said second client device occurred because of no order fulfillment signal having been received in relation to said order associated with said second client device;

implementing a day-type-dependent, time-of-day-dependent dispensation delay prediction function to generate a dispensation delay prediction of said first provider facility at least partly based on transaction history data from said first provider facility, wherein said transaction history data indicates said difference between when said second client device entered said vicinity of said first provider facility and when said second client device left said vicinity of said first provider facility as said component of empirical delay time data based on said first same-type day, relating to said first provider facility; and transmitting said dispensation delay prediction of said first provider facility via said display screen of said first client device aboard said first vehicle and travel time predictions to said first provider facility and to a second provider facility from a current location of said first client device, wherein said dispensation delay prediction and said travel time predictions to said first provider facility and to said second provider facility from said current location of said first client device are all presented simultaneously via a display screen of said first client device aboard said first vehicle, wherein after said dispensation delay prediction is transmitted via said first client device a corresponding order is received via said first client device aboard said first vehicle for a delivery at said first provider facility, wherein said transmitting said dispensation delay prediction of said first provider facility via said display screen of said first client device aboard said first vehicle includes distilling a representative intermediate value of empirical delay time data based on two or more same-type days and specifically pertaining to said first provider facility, wherein said representative intermediate value is partly based on said single day part of said first same-type day corresponding to said current day part and partly based on said single day part of said second same-type day corresponding to said current day part, and wherein said two or more same-type days include said first and second same-type days.

2. The computer-implemented order facilitation method of claim 1, further comprising:
making a determination that no point-of-sale delivery fulfilling said order was reported at said first provider facility; and
invoking said conditional response to no order fulfillment signal having been received in response to said determination that no point-of-sale delivery fulfilling said order was reported at said first provider facility.

3. The computer-implemented order facilitation method of claim 1, further comprising:
deriving said representative intermediate value without regard to one or more outlying values in said empirical delay time data by arithmetically combining several other values in said empirical delay time data.

4. The computer-implemented order facilitation method of claim 1, further comprising:
deriving said representative intermediate value as a median of a plurality of appropriate values in said empirical delay time data wherein said representative intermediate value is thereby computed without regard to one or more outlying values of said plurality of appropriate values in said empirical delay time data and wherein said plurality of appropriate values are identified by selectively recent-enough wait time data concerning said first provider facility and also by selectively including into said empirical delay time data one or more justified wait time estimates upon which said empirical delay time data is based.

5. The computer-implemented order facilitation method of claim 1, further comprising:
receiving a request from an authorized user to toggle a Boolean exceptionality value from an off state to an on state in relation to a particular day;
computing said representative intermediate value based on said on state of said Boolean exceptionality value in relation to one or more day parts of said particular day, wherein said particular day is said current day or a future day; and
transmitting said representative intermediate value based on said on state of said Boolean exceptionality value to said display screen of said first client device aboard said first vehicle as said dispensation delay prediction.

6. The computer-implemented order facilitation method of claim 1, further comprising:
receiving one or more menu selections uttered within the first vehicle from an occupant who has seen the dispensation delay prediction on the display screen of the first client device aboard the first vehicle; and
recognizing at least one of the one or more menu selections via a speech recognition module and a microphone in the first client device.

7. The computer-implemented order facilitation method of claim 1, further comprising:
receiving a request from an authorized user to toggle a Boolean exceptionality value from an off state to an on state in relation to a particular day;
computing said representative intermediate value based on said on state of said Boolean exceptionality value in relation to one or more day parts of said particular day, wherein said particular day is said current day or a future day;
transmitting said representative intermediate value based on said on state of said Boolean exceptionality value to said display screen of said first client device aboard said first vehicle as said dispensation delay prediction;
receiving another request to toggle said Boolean exceptionality value from said off state to said on state in relation to said particular day;
computing said representative intermediate value again based on said off state of said Boolean exceptionality value in relation to one or more day parts of said particular day; and
transmitting said representative intermediate value based on said off state of said Boolean exceptionality value to said display screen of said first client device aboard said first vehicle as said dispensation delay prediction.

8. A computer-implemented order facilitation method relating first and second client devices to a first provider facility wherein said first client device is aboard a first vehicle, said computer-implemented order facilitation method comprising:
obtaining a category of a current day and a current day part within said current day, wherein said day part of said current day correlates to a single day part of a first same-type day corresponding to said current day part and to a single day part of a second same-type day also corresponding to said current day part and wherein at least one prior day within a week before said current day is not a same-type day, wherein said category indicates that said current day is exceptional, wherein said first and second same-type days are also exceptional, wherein said computer-implemented order facilitation method has applied a longer threshold to said first and second same-type days than a threshold applicable to unexceptional prior days in said computer-implemented order facilitation method, and wherein said longer threshold is more than 4 months;
responding to an indication that an order was associated with said second client device by computing a difference between when said second client device entered a vicinity of said first provider facility and when said second client device left said vicinity of said first provider facility according to one or more timestamps associated with Global Positioning System (GPS) coordinates as a component of empirical delay time data based on said first same-type day;

transmitting order and payment parameters to said first provider facility so as to facilitate pre-arrival order fulfillment; and transmitting a dispensation delay prediction, relating to said first provider facility via a display screen of said first client device aboard said first vehicle partly based on when said second client device reached said vicinity of said first provider facility on said first same-type day and partly based on when a dispensation associated with said second client device occurred on one or more same-type days including said first same-type day.

9. The computer-implemented order facilitation method of claim 8, wherein said transmitting said dispensation delay prediction, of said first provider facility via said display screen of said first client device aboard said first vehicle includes distilling a representative intermediate value of said empirical delay time data based on more than two same-type days and specifically pertaining to said first provider facility, wherein said representative intermediate value is partly based on said single day part of said first same-type day corresponding to said current day part and partly based on said single day part of said second same-type day corresponding to said current day part, and wherein said more than two same-type days include said first and second same-type days.

10. The computer-implemented order facilitation method of claim 8, wherein said transmitting said dispensation delay prediction of said first provider facility via said display screen of said first client device aboard said first vehicle includes establishing when said dispensation associated with said second client device occurred on said one or more same-type days according to a dispensation confirmation received on said second-type day.

11. The computer-implemented order facilitation method of claim 8, wherein said transmitting said dispensation delay prediction of said first provider facility via said display screen of said first client device aboard said first vehicle includes establishing when said dispensation associated with said second client device occurred on said one or more same-type days according to when said second client device left said vicinity of said first provider facility on said second same-type day.

12. A computer-implemented order facilitation system relating first and second client devices to a first provider facility wherein said first client device is aboard a first vehicle, said computer-implemented order facilitation system comprising:

transistor-based circuitry configured to obtain a category of a current day and a current day part within said current day, wherein said day part of said current day correlates to a single day part of a first same-type day corresponding to said current day part and to a single day part of a second same-type day also corresponding to said current day part and wherein at least one prior day within a week before said current day is not a same-type day, wherein said category indicates that said current day is exceptional, wherein said first and second same-type days are also exceptional, wherein said computer-implemented order facilitation system is configured to apply a longer threshold to said first and second same-type days than a threshold applicable to unexceptional prior days in said computer-implemented order facilitation system, and wherein said longer threshold is more than 4 months;

transistor-based circuitry configured to respond to an indication that an order was associated with said second client device by computing a difference between when said second client device entered a vicinity of said first provider facility and when said second client device left said vicinity of said first provider facility according to one or more timestamps associated with Global Positioning System (GPS) coordinates as a component of empirical delay time data based on said first same-type day;

transistor-based circuitry configured to transmit order and payment parameters to said first provider facility so as to facilitate pre-arrival order fulfillment; and transistor-based circuitry configured to transmit a dispensation delay prediction, relating to said first provider facility via a display screen of said first client device aboard said first vehicle partly based on when said second client device reached said vicinity of said first provider facility on said first same-type day and partly based on when a dispensation associated with said second client device occurred on one or more same-type days including said first same-type day.

13. The computer-implemented order facilitation method of claim 12, including the first client device aboard the first vehicle configured to facilitate speech recognition of one or more uttered menu selections within the first vehicle.

14. The computer-implemented order facilitation system of claim 12, wherein all of said transistor-based circuitry is remote from said first vehicle.

15. The method of claim 8, wherein said transmitting said dispensation delay prediction relating to said first provider facility via said display screen of said first client device aboard said first vehicle partly based on when said second client device reached said vicinity of said first provider facility on said first same-type day and partly based on when a dispensation associated with said second client device occurred on said one or more same-type days comprises:

transmitting a travel time index that pertains to one or more destination provider facilities to which current navigational guidance pertains, wherein said one or more destination provider facilities includes said first provider facility.

16. The method of claim 8, wherein said transmitting said dispensation delay prediction relating to said first provider facility via said display screen of said first client device aboard said first vehicle partly based on when said second client device reached said vicinity of said first provider facility on said first same-type day and partly based on when a dispensation associated with said second client device occurred on said one or more same-type days comprises:

transmitting a travel time index and a wait time index that are both simultaneously displayed with navigation guidance to said first provider facility and that both pertain to said first provider facility.

17. The method of claim 8, further comprising:

receiving a request to toggle a Boolean exceptionality value from an off state to an on state in relation to said first same-type day, wherein said Boolean exceptionality value is a component of said category;

computing a representative intermediate value based on said on state of said Boolean exceptionality value in relation to said current day part within said current day; and transmitting said representative intermediate value based on said on state of said Boolean exceptionality value to display screen of said first client device aboard said first vehicle as said dispensation delay prediction.

18. The method of claim 8, wherein said transmitting said dispensation delay prediction relating to said first provider facility via said display screen of said first client device aboard said first vehicle partly based on when said second client device reached said vicinity of said first provider facility on said first same-type day and partly based on when a dispensation associated with said second client device occurred on said one or more same-type days comprises:
   transmitting a travel time prediction pertaining to said first provider facility, a travel time prediction pertaining to a second provider facility, and a dispensation delay prediction pertaining to said first provider facility all to said first client device, wherein said travel time prediction pertaining to said first provider facility, said travel time prediction pertaining to said second provider facility, and said dispensation delay prediction pertaining to said first provider facility are all presented simultaneously in a single image via said display screen of said first client device.

19. The method of claim 8, wherein said longer threshold is 18 to 38 months.

20. The computer-implemented order facilitation method of claim 12, wherein said threshold applicable to said unexceptional prior days is less than 18 months.

* * * * *